United States Patent [19]
Choi et al.

[11] Patent Number: 5,623,140
[45] Date of Patent: Apr. 22, 1997

[54] NONBIASED BISTABLE OPTICAL DEVICE HAVING A LOWER MIRROR HAVING A PLURALITY OF REFLECTIVE LAYERS REPEATEDLY FORMED ON A SUBSTRATE

[75] Inventors: Young-Wan Choi, Seoul; O-Kyun Kwon; El-Hang Lee, both of Daejeon, all of Rep. of Korea

[73] Assignee: Electronics and Telecommunications Research Institute, Daejeon, Rep. of Korea

[21] Appl. No.: 451,059

[22] Filed: May 25, 1995

[30] Foreign Application Priority Data

Nov. 18, 1994 [KR]  Rep. of Korea ............... 94-29926
Nov. 21, 1994 [KR]  Rep. of Korea ............... 94-30617

[51] Int. Cl.⁶ .............................................. H01J 40/14
[52] U.S. Cl. ..................... 250/214 R; 250/214.1; 250/214 LS; 377/102; 257/21
[58] Field of Search ................. 250/214 R, 214 LS, 250/214.1, 551; 377/102; 359/107, 243; 257/21, 433

[56] References Cited

U.S. PATENT DOCUMENTS

| | | | |
|---|---|---|---|
| 4,546,244 | 10/1985 | Miller | 250/211 J |
| 4,904,858 | 2/1990 | LaMarche | 250/214 LS |
| 4,914,286 | 4/1990 | Chirovsky et al. | 377/102 |
| 4,952,791 | 8/1990 | Hinton et al. | 377/102 |
| 5,233,184 | 8/1993 | Chirovsky et al. | 250/214 LS |
| 5,424,559 | 6/1995 | Kasahara | 257/21 |
| 5,426,312 | 6/1995 | Whitehead | 257/21 |

*Primary Examiner*—Stephone Allen
*Attorney, Agent, or Firm*—Larson and Taylor

[57] ABSTRACT

Disclosed is a nonbiased bistable optical device and a method for fabricating the device, which has a semi-insulating GaAs substrate; a lower mirror having a plurality of reflecting layers which are repeatedly formed on said substrate at least more than twelve times, each of said reflecting layers having a first reflecting film having a first refractive index on said substrate and a second reflecting film a second refractive index different from the first refractive index; a first contact layer formed on the lower mirror; a first buffer layer formed on the first contact layer; a multiple quantum well(MQW) having a plurality of shallow layers which are repeatedly formed, each of said shallow layers having a barrier and a shallow quantum well; a second buffer layer grown on said MQW; and a second contact layer formed on said second buffer layer. The device has an excellent bistablity even without an external applied voltage.

6 Claims, 20 Drawing Sheets

——— IMPEDANCE-MATCHED AFP NOBS

- - - - - - - IMPEDANCE-MISMATCHED AFP NOBS

NONBIASED BISTABLE OPTICAL DEVICE HAVING A LOWER MIRROR HAVING A PLURALITY OF REFLECTIVE LAYERS REPEATEDLY FORMED ON A SUBSTRATE

BACKGROUND OF THE INVENTION

1. Field of the Invention

The present invention relates to a nonbiased bistable optical device and a method for fabricating the same, and in more particular to a symmetric self electro-optic effect device (hereinafter, referred to as "S-SEED") having optical bistablity when an externally applied voltage is not supplied, and being capable of functioning as an optical logic device.

2. Description of the Prior Art

Optical bistablity is to be a principal character necessary for implementing a parallel optical-signal processing system, an optical exchange, an optical computer or the like, and some optical bistable devices using optical bistablity has been known in the art. One of them is an S-SEED in which two PIN diode SEED's are connected in series and each of the SEED's has a multiple quantum well structure in an intrinsic region thereof. This S-SEED structure is disclosed in the publication of U.S. Pat. No. 4,546,244 entitled "NONLINEAR AND BISTABLE OPTICAL DEVICE" granted Oct. 8, 1985 to Darvid A. B. Miller et al. The publication describes an S-SEED structure having a multiple quantum well (hereinafter, referred to as "MQW") structure, wherein a photocurrent is produced by an optical beam absorbed in the MQW thereof and a voltage responsive to the photocurrent is applied to the MQW, so that an optical absorbance of the MQW is changed. The S-SEED has advantageously a relatively low switching energy and can be easily implemented in two-dimensional array using a conventional fabrication process of compound semiconductor so as to make easy parallel optical-signal processing.

FIG. 1 is a cross-sectional view of a conventional S-SEED, and FIGS. 2 and 3 are a plane view and a diagram of an equivalent circuit, respectively.

Referring to FIGS. 2 and 3, the same components as those in FIG. 1 are indicated by the same reference numerals. Reference numeral 7 indicates interface between mesa-etched portions of PIN diodes and reference numeral 8 represents interface portions etched to electrically isolate elements.

As shown in FIG. 3, the conventional S-SEED is provided with two PIN diode SEED's D1 and D2 which are connected in series. When the S-SEED is supplied with a reverse voltage VAP, it has optical bistablity because one SEED of the two SEED's serves as a load for the other. The reverse voltage VAP is applied to a metal pad 5, as shown in FIGS. 1 and 2. In FIG. 1, reference numerals 1 and 2 indicate n-ohmic metal and p-ohmic metal, respectively. The n-ohmic metal and p-ohmic metal between two PIN diodes are electrically connected by a metal interconnection 4. Similar to, the other ohmic metal is electrically connected to the metal pad 5 through another metal interconnection 4. The S-SEED is supplied with an externally applied voltage through the metal pad 5.

As shown in FIG. 1, the two PIN diodes are electrically isolated with each other by etching an undoped quarter-wavelength reflector stack 11 on a semi-insulating substrate 10. Next, an insulating layer 3 of $SiN_x$ or $SiO_2$ is formed thereon so as to prevent the S-SEED from electrical crosstalk and surface oxidation. The optical beam is introduced to the PIN diode through an optical window 6.

Hereinafter, a method for fabricating the above described S-SEED will be described with reference to FIGS. 1 and 2.

Referring to FIG. 1, on a semi-insulating substrate 10 is sequentially formed an undoped quarter-wavelength reflector 11, an n type layer, an intrinsic MQW and a p type layer. After formation of the p type layer, a well-known etching process is performed in a vertical direction so as to achieve electrical isolation of PIN diodes. An n-ohmic metal 1 is provided for ohmic contact with the n type layer and then an insulating layer 3 is deposited thereon to prevent the device from electrical crosstalk and surface oxidation. Next, the insulating layer 3 is selectively removed to form an optical input/output window 6 on the p type layer, a p-ohmic metal 2 is deposited on the p type layer and a metal interconnection layer 4 is coated to achieve an electrical interconnection. Finally, a thick metal pad 5 is provided on the insulating layer 3 for wire-bonding.

In the S-SEED fabricated by the above method, when two PIN diodes connected in series are supplied with a reverse voltage VAP, one diode of the two PIN diodes serves as a load for the other. Then, a photocurrent occurring due to the reverse voltage has nonlinearity according to nonlinear absorbance of the MQW therein, and thus a voltage across each of the PIN diodes is not to be VAP/2 [V].

FIG. 17 shows a two-dimensional array of 4 by 8 using a conventional S-SEED. It can be seen from FIG. 17 that the array has a similar structure even if a two-dimensional array becomes larger. As shown in FIG. 17, since each S-SEED of the two-dimensional array has to be supplied with a reverse voltage, a metal line has to be inevitably located between S-SEED's and a metal pad is required for wire-bonding.

In FIG. 18, an equivalent circuit of the two-dimensional array of FIG. 17 is shown and all of S-SEED's are electrically connected. In this connection, if only one S-SEED is short-circuited with another S-SEED, the array can not be used for an integrated circuit because a reverse voltage can be applied thereto. Also, if S-SEED's in the array increase in number, a metal line for electrical connection with the p type layer is liable to be in contact with a metal line for electrical connection with the n type layer. In case S-SEED's are arranged in the two-dimensional array as shown in FIG. 17, the array needs to include metal interconnection lines for supplying a reverse voltage and connecting elements, a metal pad for wire-bonding, and a wiring line for applying an external source. Thus, such additionally requiring lines cause inductive coupling between the lines, electromagnetic interference due to an electromagnetic field and crosstalk. Particularly, in case of formation of an S-SEED array, each of SEED's can not be electrically separated from each other because all cathodes of SEED's have to be connected to an input terminal for one external source supply. Accordingly, if S-SEED's in the array increase in number, the above described problems are more and more serious, whereby to be low in yield and integration degree. Since the metal interconnection and wiring lines also serve as parasitic passive elements in SEED or S-SEED circuit, there is a disadvantage in high-speed switching. Therefore, if an optical device is capable of functioning as an optical logic circuit and has optical bistablity under non-bias of voltage, the above mentioned problems occurring in an S-SEED or an S-SEED array due to a reverse voltage can be eliminated.

FIG. 5 shows a load curve of a photocurrent $I_p$ in a conventional S-SEED circuit. In FIG. 5, a horizontal axis of the load curve is a voltage V to be applied to the anode of a first diode D1 as shown in FIG. 4. The solid line and dotted line in the load curve indicate load curves of the first and second diodes D1 and D2, respectively. At operation point A, a voltage V equal to nearly zero [V] is applied to the anode of the first diode D1 and a reverse voltage VAP of VAP–V is applied to the anode of the second diode D2. On the contrary, at operation point B, if a voltage of V=VAP is applied to the anode of the first diode D1, to the anode of the second diode a voltage equal to nearly zero [V], VAP–V=0, is applied. In the S-SEED circuit of FIG. 4, the diodes having the same structure are connected in series, but different voltages from each other can be stably applied to the SEED diodes D1 and D2. Thus, different electric fields from each other are induced to MQW's in intrinsic regions of two SEED diodes, respectively, and thereby the diodes are different in optical absorbance. Due to the different optical absorbance in two SEED diodes, each SEED becomes different in reflectance. Also, due to nonlinear photocurrent produced by absorbed optical light, the S-SEED circuit has positive feedback characteristics. As a result, the S-SEED circuit has optical bistablity to serve as an optical logic device, as shown in FIG. 6.

In FIG. 6, the ordinate R indicates optical reflectance of a SEED and the abscissa Pin indicates intensity of input light. □P is a range of optical bistablity in an S-SEED, Ron is reflectance at ON-state, Roff is reflectance at OFF-state and □R is the difference Ron–Roff between the reflectance of ON-state and the reflectance of OFF-state. Such a SEED is a device utilizing quantum confined stark effect (hereinafter, referred to as "QCSE"), wherein QCSE means that a heavy hole exciton absorption peak of MQW is red-shifted in accordance with an induced electric field to nonlinearly reduce absorption coefficient at a fixed operation wavelength of the MQW, and thus photocurrent and reflectance are nonlinearly varied in accordance with optical ON/OFF state. This nonlinear characteristics of MQW allow the SEED to serve as an optical logic device in accordance with the above described principle of the S-SEED circuit.

FIG. 7 shows load curves of the S-SEED circuit, which has SEED's utilizing the QCSE, when an externally applied voltage VAP is set to be zero [V]. As can be seen from FIG. 7, at VAP=0, a cross of two curves, an operating point of the S-SEED is only one point as indicated by "C". Thus, two SEED diodes are constantly supplied with zero voltage, e.g. V=0, even if optical beams are simultaneously introduced to each the SEED's of the S-SEED. Therefore, all of the SEED's keep energy band in thermal equilibrium, as shown in FIG. 8. In the above drawing, since the MQW of intrinsic region is induced with only an electric field responsive to a built-in voltage VBI in the respective PIN diodes and each electric field of the diodes is equal, the S-SEED is unable to have an optical bistablity at VAP=0. This is because a difference □Ec between a conduction band energy in barrier and well layers of the SEED utilizing QCSE and the total thickness d of the MQW of intrinsic region are large and thus an electric field responsive to the built-in voltage VBI of the intrinsic region is low, wherein EC and EV indicate a conduction band energy and a valance band energy, respectively, and EF indicates a Fermi energy.

FIG. 9 shows load curves of the S-SEED circuit in which an intrinsic region is formed of a shallow MQW (hereinafter, referred to as "SMQW"). In FIG. 9, VE indicates a voltage applied to the first diode D1 when operating point of the S-SEED circuit having SMQW is a point E, and VF indicates a voltage applied to the first diode D1 when operating point of the S-SEED circuit having MQW is a point F. FIG. 10 shows an energy band of thermal equilibrium in the S-SEED circuit having the load characteristics of FIG. 9. In FIG. 9, there exist stably operating points E and F, even if VAP=0, and this means that different voltages may be applied to two SEED devices of the S-SEED circuit. As a result, the S-SEED circuit has optical characteristics even when VAP=0. This is, as shown in FIG. 10, because the SMQW is extremely low, or not more than 30 meV, if any, in a conduction band energy offset between well and barrier layers thereof, thereby allowing it to cause a low-field electroabsorption.

FIG. 11 shows an example of a well-known reflection type SEED. With reference to FIG. 11, the reflection type SEED has a lower mirror, a PIN diode with an MQW layer using as an intrinsic region and a non-reflecting layer, which are sequentially formed on a substrate 11. The lower mirror has a plurality of reflecting layers. Each of the reflecting layers comprises a first λ/4n reflecting film 12 in which an optical thickness is a high refractive index having a quarter-exciton operation wavelength of the MQW layer, and a second λ/4n reflecting film 13 having a relatively low index. The anti-reflecting layer is provided to improve an absorption coefficient of the SEED. The PIN diode has the MQW layer between an n⁻ layer 14 and a p⁻ layer 18. In the PIN diode, the n⁻ layer 14, p⁻ layer 18, a barrier layer, a buffer layer and the lower mirror other than the MQW layer are formed of material in which absorption is not caused even at any operation wavelength.

FIG. 12 shows a structural example of an asymmetric Fabry-Perot SEED (hereinafter, referred to as "AFP-SEED"), as another example of the reflection type SEED. As shown in FIG. 12, the AFP-SEED has the same construction as that of FIG. 12 except that an upper mirror is formed in place of the non-reflecting layer on the MQW layer. The upper mirror has the same construction as that of the lower mirror. In the AFP-SEED, a thickness L between the lower and upper mirrors is set to be an integer multiple of quarter-operation wavelength.

FIG. 13 shows a refractive index according to the product α(E)×D of absorption coefficient α and a total thickness D of a light absorbing layer when the AFP-SEED with a non-reflecting layer is 0.32 or 0.5 in refractive index Rf of the upper mirror. In FIG. 13, A1 and A2 are values of αD to meet the impedance-matching condition of an optical signal introduced in the AFP-SEED when Rf are 0.32 and 0.5, respectively. Since α is determined by the structure of the MQW layer, it is lowered in accordance with increase of an electric field at exciton resonance wavelength of the MQW, as shown in FIG. 14. Therefore, decrease of α brings about increase of refractive index as shown in FIG. 13 and thus the AFP-SEED meets a normally-off condition that the refractive index is increased in accordance with increase of the electric field. As a result, the AFP-SEED has optical bistablity.

The normally-off conditions of the AFP-SEED is satisfied in the left regions of A1 and A2 to meet the impedance-matching condition of an optical signal introduced in the AFP-SEED as shown in FIG. 13. In FIGS. 15 and 16, a point of A1 is the value of αD in the AFP-SEED meeting an impedance-matching condition and a point of B1 is the value of the value of αD in another AFP-SEED meeting an impedance-mismatching condition. It can be seen from FIGS. 15 and 16 that, in the point of A1 to meet the impedance-matching condition, a value of CR (a ratio of a reflectance of ON state to a reflectance of OFF state, or ON/OFF contrast ratio) is extremely high, but ΔR (a difference between the reflectance of ON state and the reflectance of OFF state) is not more than 0.2. Also, in the point of B1 to meet the impedance-mismatching condition, ΔR can be maintained about 0.3 when the value of CR is sufficiently set about 10.

Particularly, since the value of α is changed only by an internal voltage without an externally applied voltage under nonbias condition, the value of $\alpha_{on}/\alpha_{off}$ is not more than 0.35. Thus, ΔR is also lowered relatively. Therefore, it is necessary to maintain a desirable minimum value of CR and maximize ΔR as large as possible.

SUMMARY OF THE INVENTION

It is an object of the present invention to provide a nonbiased bistable optical device in which an optical bistablity is improved even without an externally applied voltage, so that above problems of a conventional optical device necessary for a reverse voltage can be eliminated and can be commercially used in an optical system.

It is a further object of the present invention to provide a nonbiased bistable optical device in which electrical connection of respective SEED's (self electro-optic effect devices) is simplified so as to improve integration degree of the device.

It is another object of the present invention to provide a nonbiased bistable optical device in which respective SEED's arranged in a two-dimensional array are electrically isolated, so that, even if any one of the SEED's has a defective, the other SEED's do not become damaged.

It is an additional object of the present invention in which a value of CR (a ratio of a reflectance of ON state to a reflectance of OFF state) can be approximately maintained and ΔR (a difference between the reflectance of ON state and the reflectance of OFF state) is maximized as large as possible.

According to the aspect of the present invention, the nonbiased bistable optical device comprising a semi-insulating GaAs substrate; a lower mirror having a plurality of reflecting layers which are repeatedly formed on said substrate at least more than twelve times, each of said reflecting layers having a first reflecting film having a first refractive index on said substrate and a second reflecting film a second refractive index different from the first refractive index; a first contact layer formed on the lower mirror; a first buffer layer formed on the first contact layer; a multiple quantum well(MQW) having a plurality of shallow layers which are repeatedly formed, each of said shallow layers having a barrier and a shallow quantum well; a second buffer layer grown on said MQW; and a second contact layer formed on said second buffer layer.

In the nonbiased bistable optical device, said shallow layers are repeatedly formed at least thirty six times. The first refractive index is relatively lower than the second refractive index. Also, the first refractive index is relatively higher than the second refractive index.

In the device, said first contact layer is a P⁺ anode contact layer and said second contact layer is an N⁺ cathode contact layer.

In the device, said first contact layer is an N⁺ cathode contact layer and said second contact layer is a P⁺ anode contact layer.

In the device, said first reflecting film is formed of undoped AlAs and said second reflecting film is formed of undoped $Al_xGa_{1-x}As(0.1 \leq x \leq 0.3)$.

According to a further aspect of the present invention, the method for fabricating the nonbiased bistable optical device comprising the steps of forming a lower mirror on a semi-insulating GaAs layer, said lower mirror having a plurality of reflecting layers which are repeatedly formed on said substrate at least more than twelve times, each of said reflecting layers having a first λ/4n reflecting film formed on said substrate and a second λ/4n reflecting film formed on said first λ/4n reflecting film, said first λ/4n reflecting film having a first refractive index, and said second λ/4n reflecting film having a second refractive index being relatively lower than the first refractive index; growing a cathode contact layer on said lower mirror, said cathode contact layer being formed of $N^+Al_xGa_{1-x}As(0.1 \leq x \leq 0.3)$; forming a first buffer layer on said cathode contact layer, said first buffer layer having undoped $Al_xGa_{1-x}As(0.1 \leq x \leq 0.3)$; forming a multiple quantum well(MQW) on said first buffer layer, said MQW having a plurality of shallow layers which are repeatedly formed at least more than thirty six times, each of said shallow layers having a barrier formed of $Al_xGa_{1-x}As(0.01 \leq x \leq 0.04)$ and a shallow quantum well formed of undoped GaAs; forming a second buffer layer on said MQW, said second buffer layer being formed of undoped $Al_xGa_{1-x}As(0.1 \leq x \leq 0.3)$; and forming an anode contact layer on said second buffer layer, said anode contact layer being formed of $P^+ Al_xGa_{1-x}As(0.1 \leq x \leq 0.3)$.

According to another aspect of the present invention, the nonbiased bistable optical device having a multiple quantum well(MQW) as an intrinsic region, lower and top mirrors having different refractive index at exciton resonance wavelength of said MQW, and an asymmetric Fabry-Perot(AFP) structure having a resonance wavelength to be matched to the exciton resonance wavelength, wherein said MQW has relatively smaller in period than an impedance-matched AFP logic device so as to reduce thickness of an optical absorbing layer of the MQW.

The nonbiased bistable optical device fabricated in accordance with the method has an excellent bistablity even without an external applied voltage.

BRIEF DESCRIPTION OF THE DRAWINGS

This invention may be better understood and its object will become apparent to those skilled in the art by reference to the accompanying drawings as follows.

DESCRIPTION OF THE PREFERRED EMBODIMENT(S)

Figure 19:
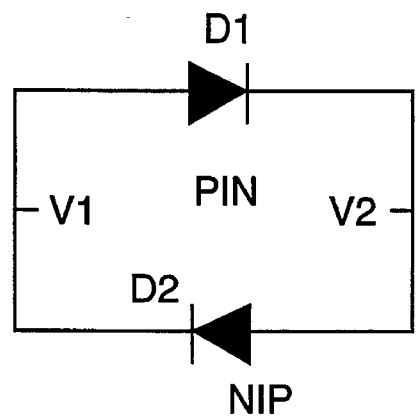
FIG. 19 is a circuit diagram of the S-SEED having a non-bias bistablity in accordance with the present invention.
Figure 17:
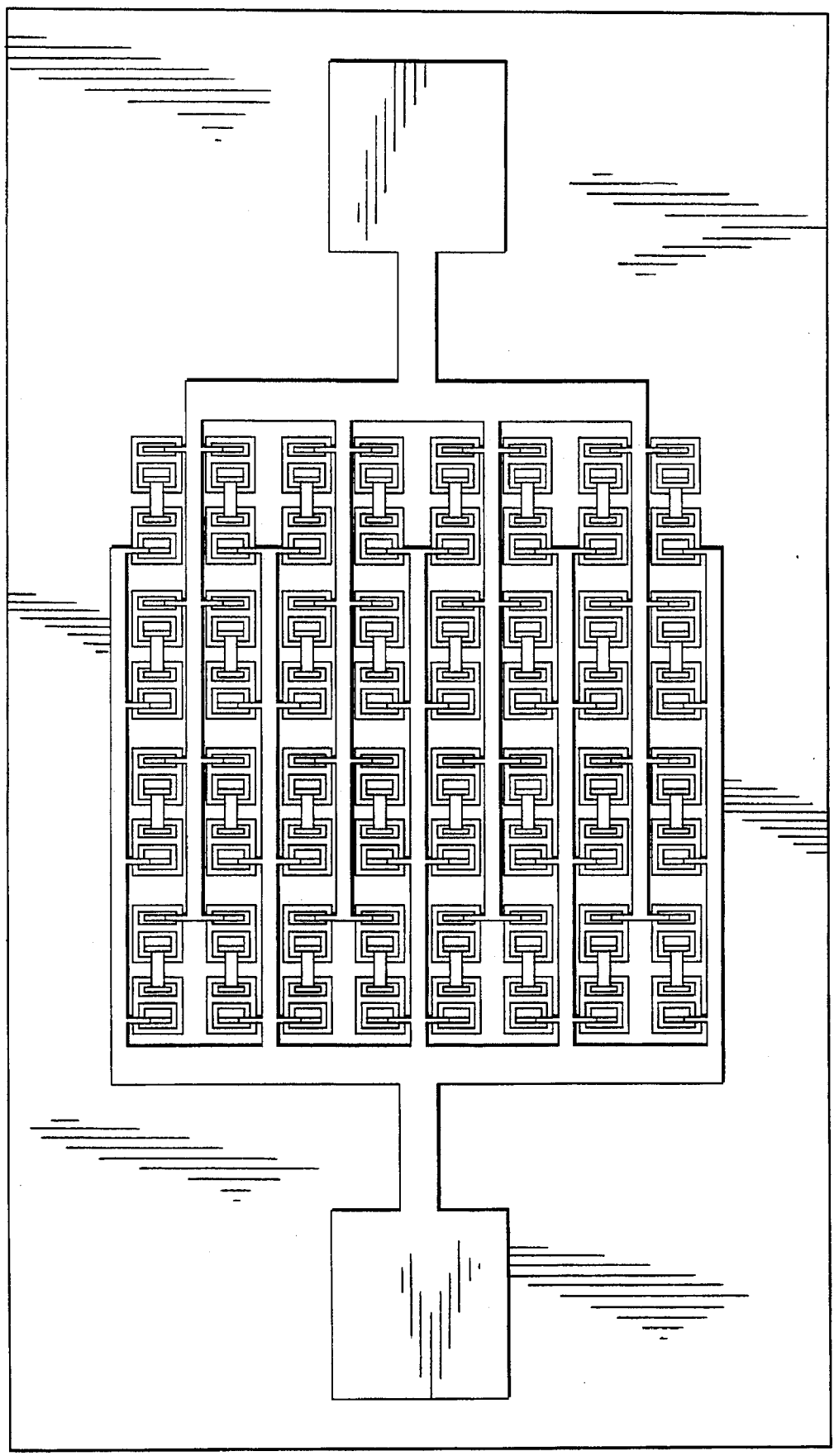
FIG. 17 is a plane view showing a two-dimensional array of the nonbiased bistable optical device having the plurality of S-SEED's.
Figure 18:
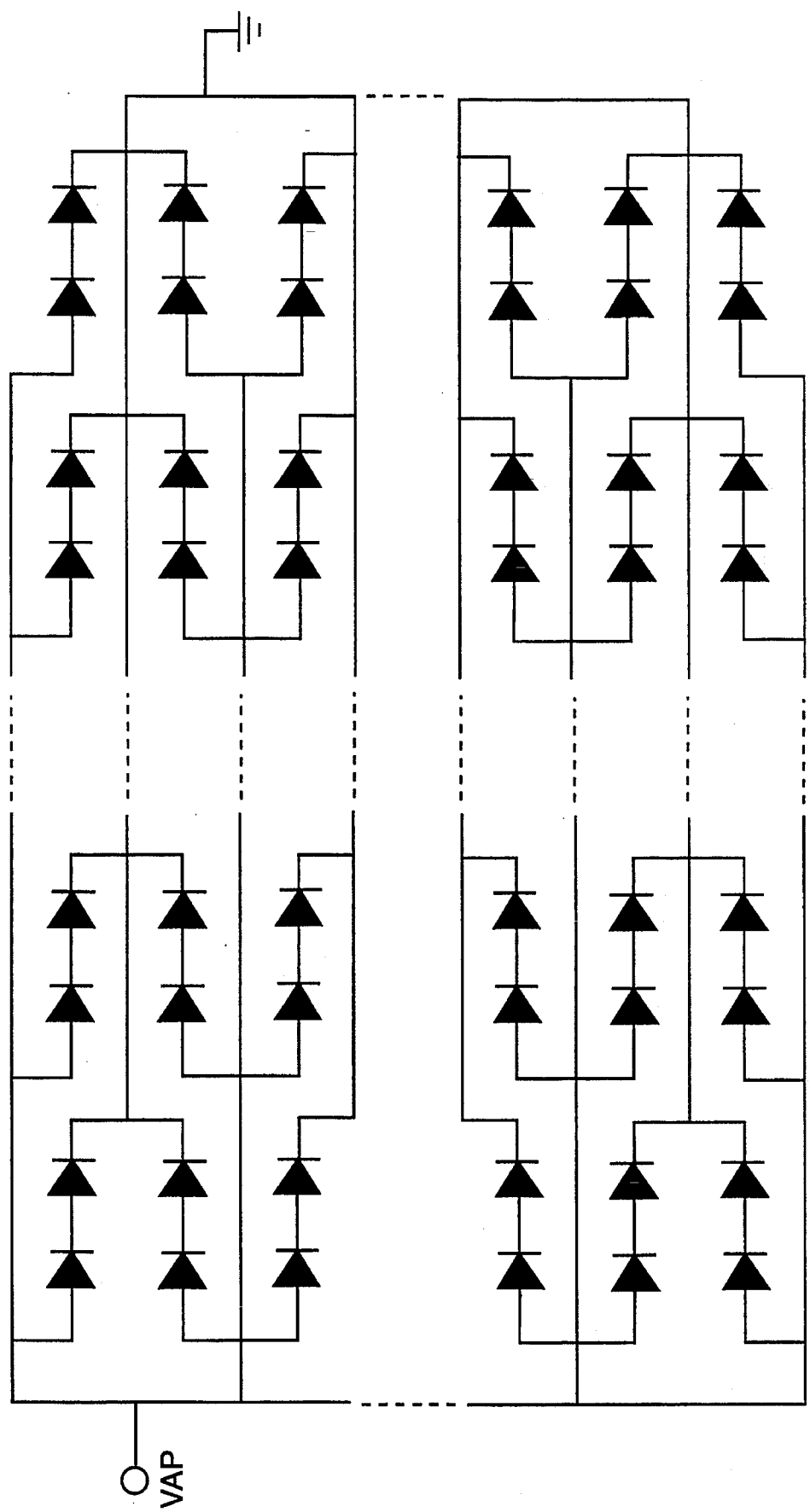
FIG. 18 is an equivalent circuit diagram of the bistable optical device arranged in two-dimensional array.

Referring to now FIG. 19, the nonbiased bistable optical device structure in accordance with the present invention consists of two PIN diode SEED's connected with each other without an externally applied device. The nonbiased bistable optical device is fabricated by the same fabrication process as that of the conventional S-SEED. Because the S-SEED of the present invention is composed of nonbiased bistable optical device, an externally applied voltage and a metallic pad are not required for the S-SEED.

Figure 1:
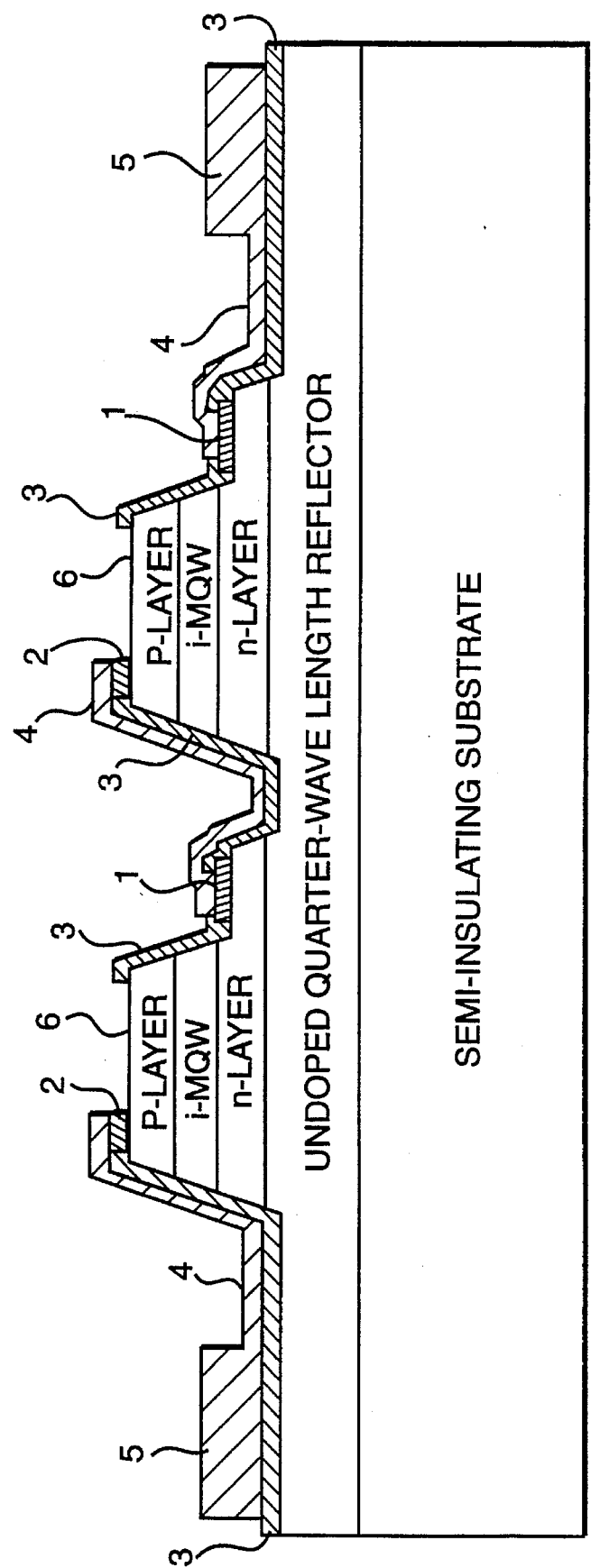
FIG. 1 is a cross-sectional view of a conventional symmetric self electro-optic effect device(S-SEED)
Figure 2:
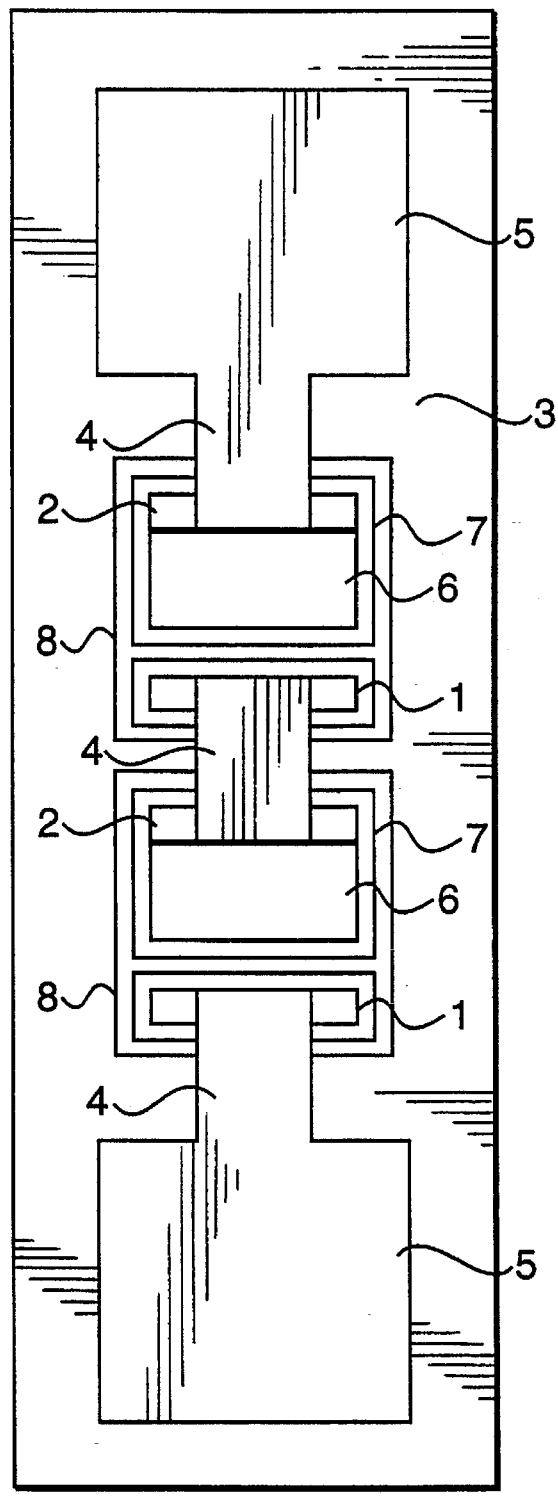
FIG. 2 is a plane view of the conventional S-SEED as shown in FIG. 1.
Figure 3:
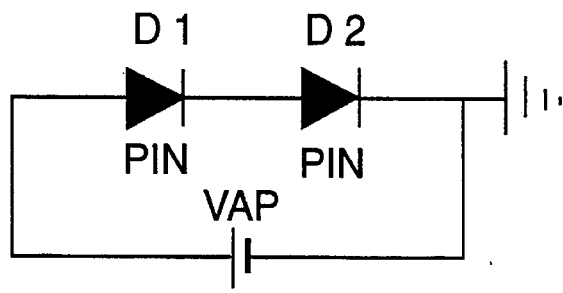
FIGS. 3 and 4 are equivalent circuit diagrams of the conventional S-SEED of FIG. 1.
Figure 4:
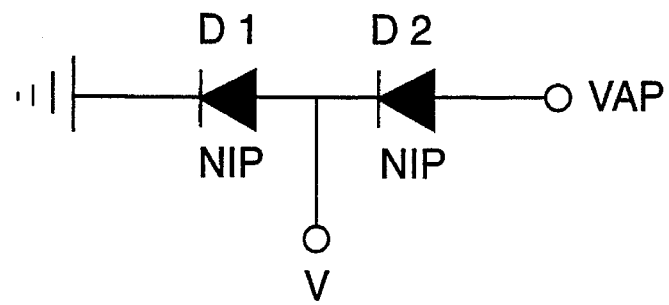
Figure 5:
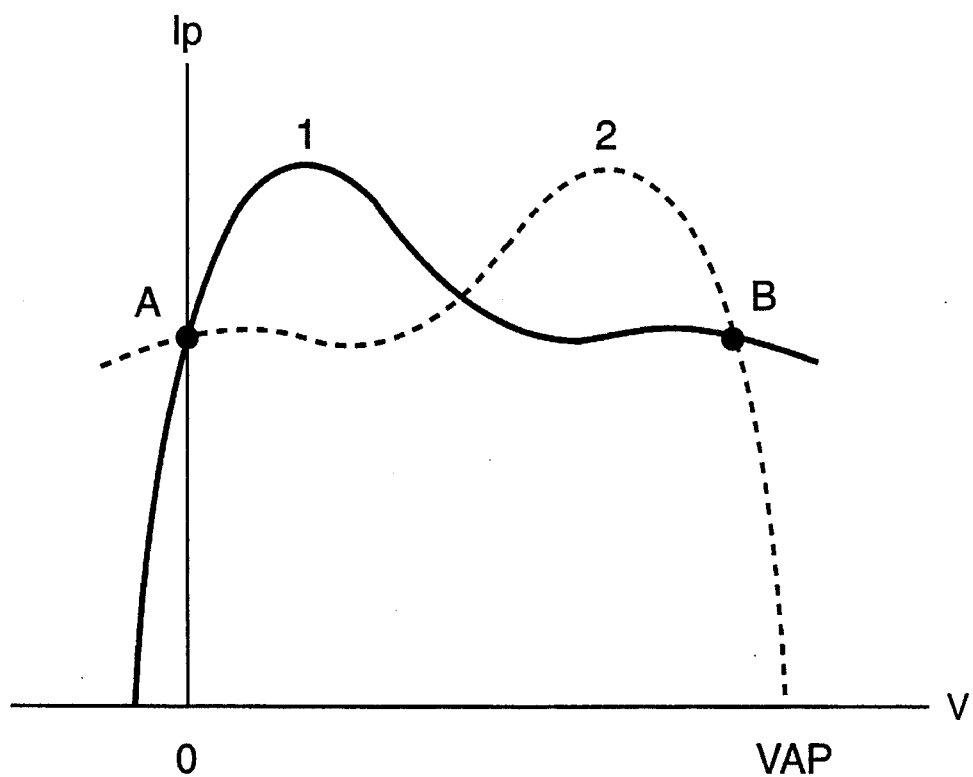
FIG. 5 is a load curve diagram of the equivalent circuit of FIG. 4.
Figure 6:
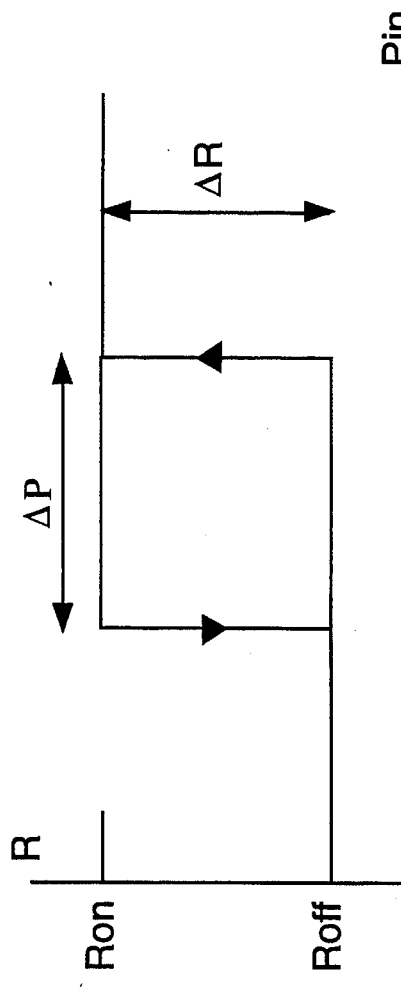
FIG. 6 is a diagram showing an optical bistablity of the equivalent circuit of FIG. 4.
Figure 7:
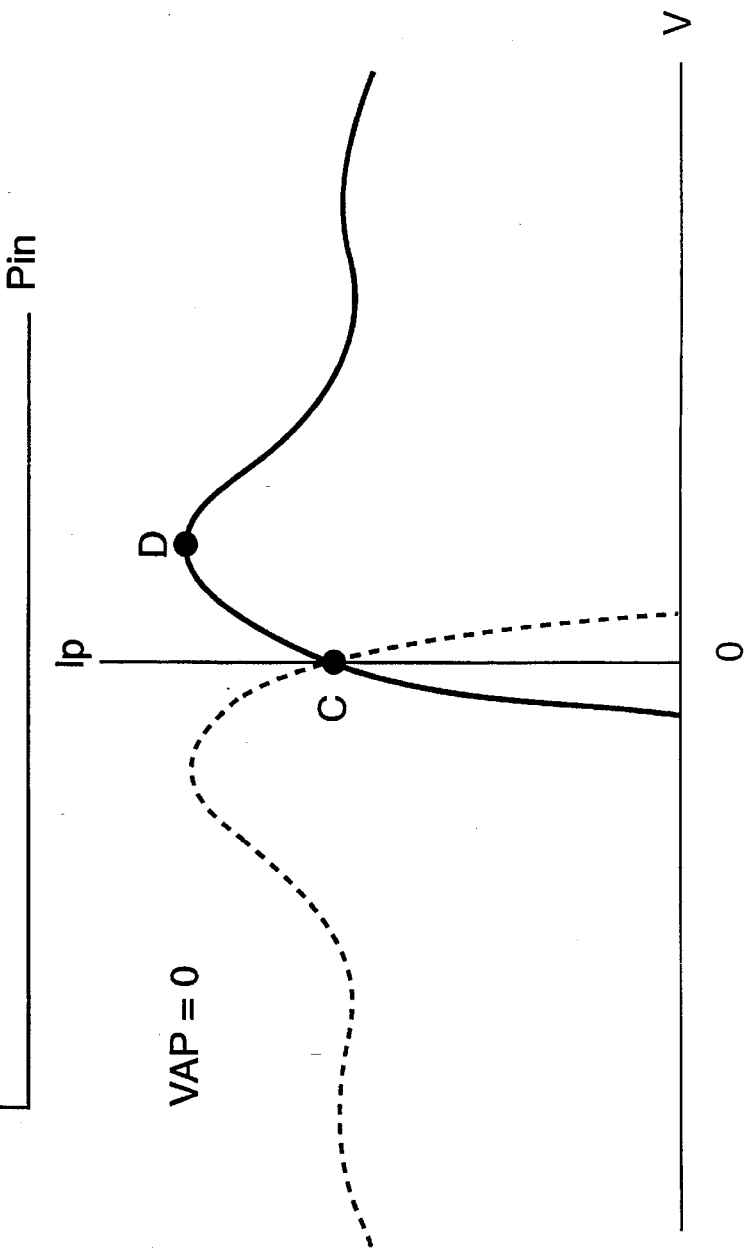
FIG. 7 is a load curve diagram of the equivalent circuit of FIG. 4 when a reverse voltage is zero [V]
Figure 8:
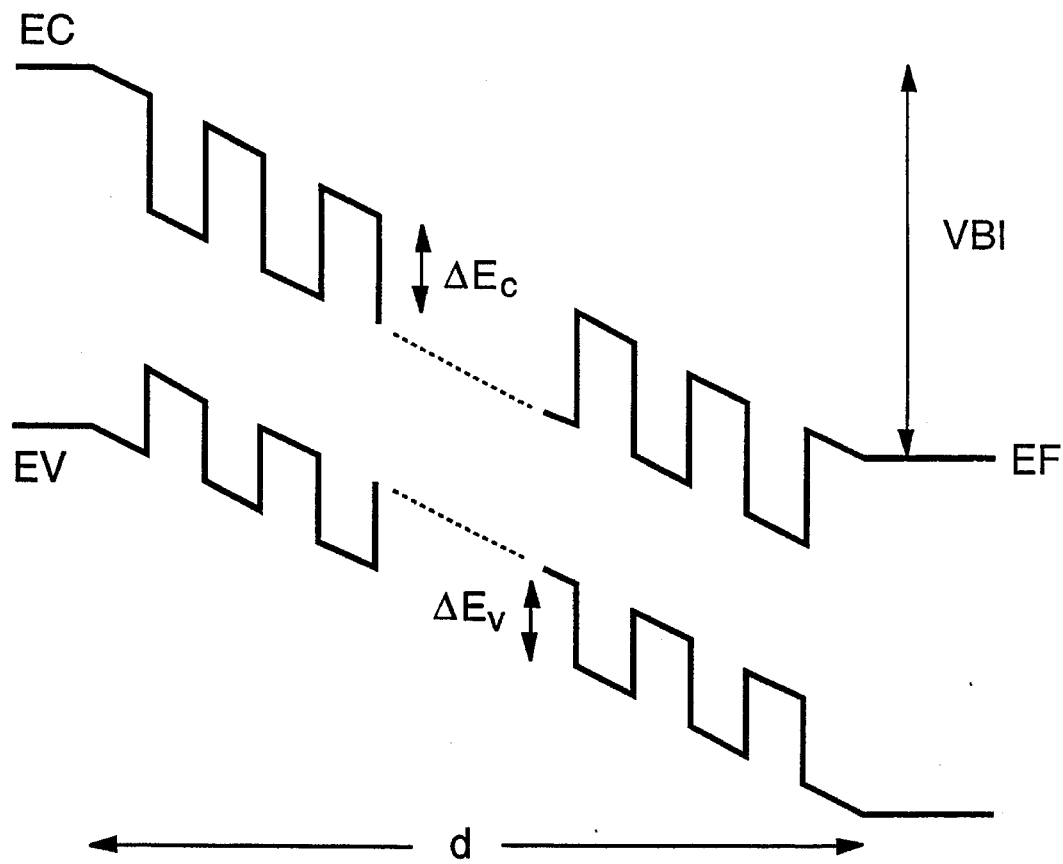
FIG. 8 is a view showing an energy band in thermal equilibrium of a conventional PIN diode SEED (self electro-optic effect device)
Figure 9:
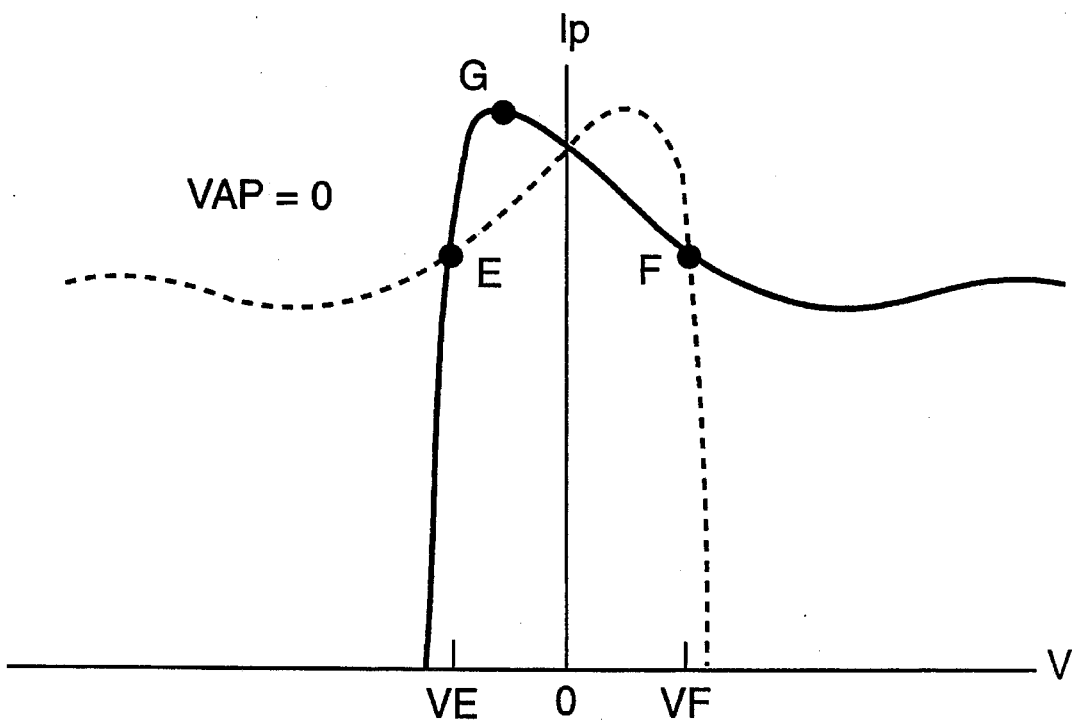
FIG. 9 is a load curve diagram of the S-SEED of FIG. 1 which has a plurality of SEED's with shallow multiple quantum well structure when a reverse voltage is zero [V]
Figure 10:
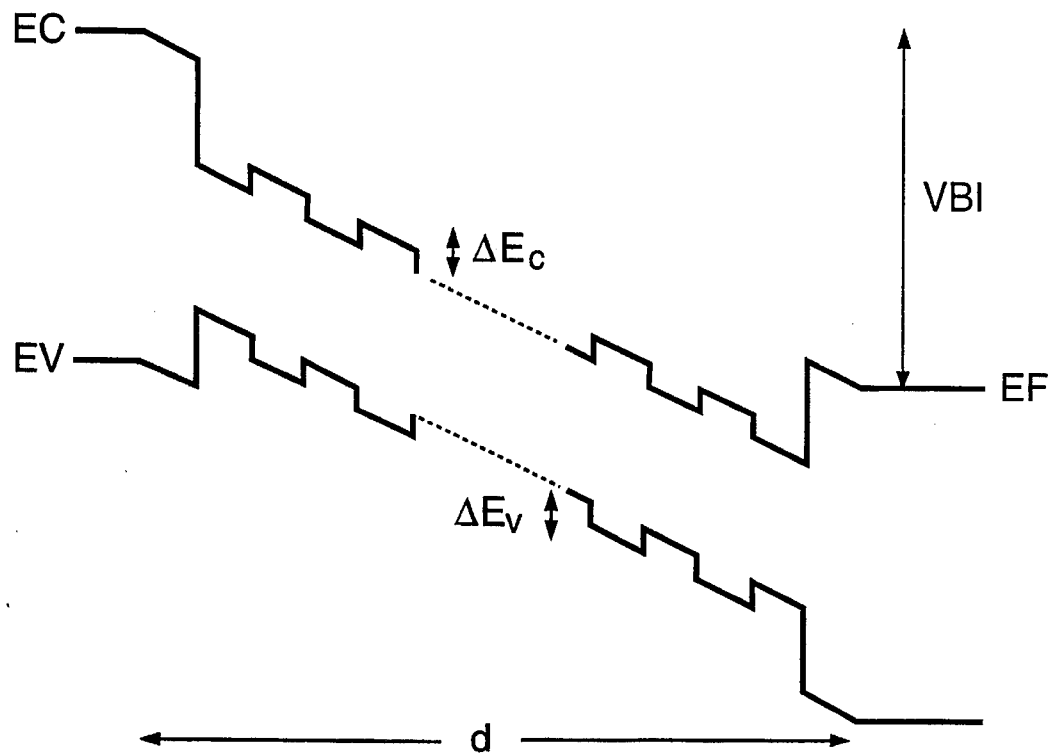
FIG. 10 is a view showing an energy band in thermal equilibrium of the conventional PIN diode SEED with shallow multiple quantum well structure.
Figure 13:
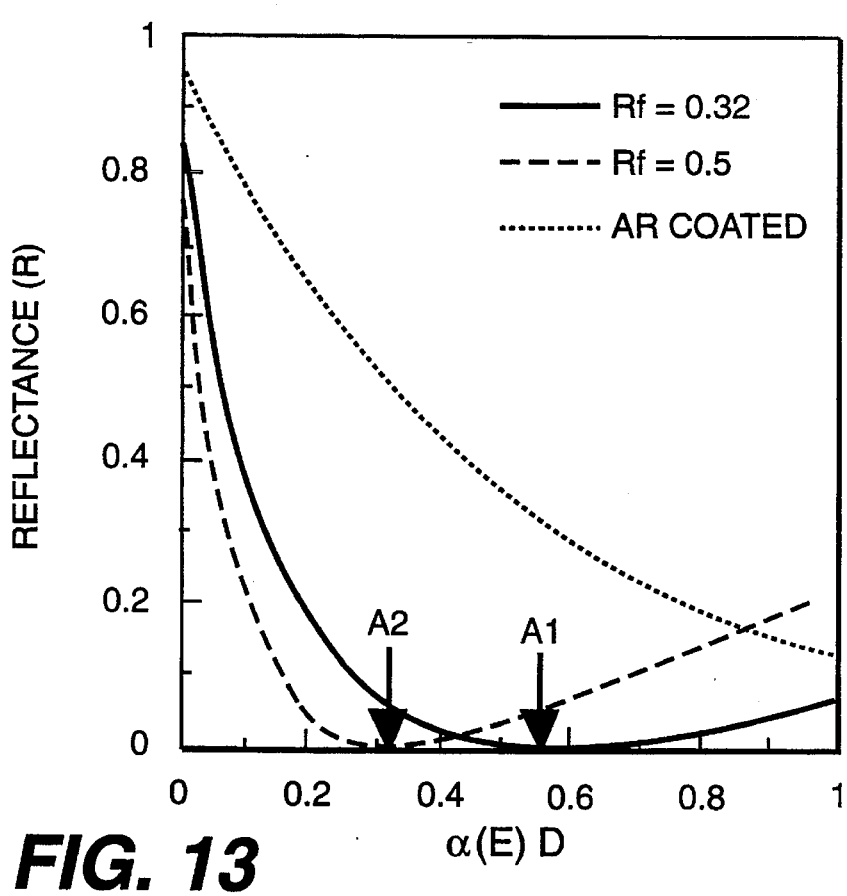
FIG. 13 is a curve diagram showing a refractive index according to the product $\alpha(E) \times D$ of absorption coefficient $\alpha$ and a total thickness D of a light absorbing layer in the AFP-SEED of FIG. 12.
Figure 11:
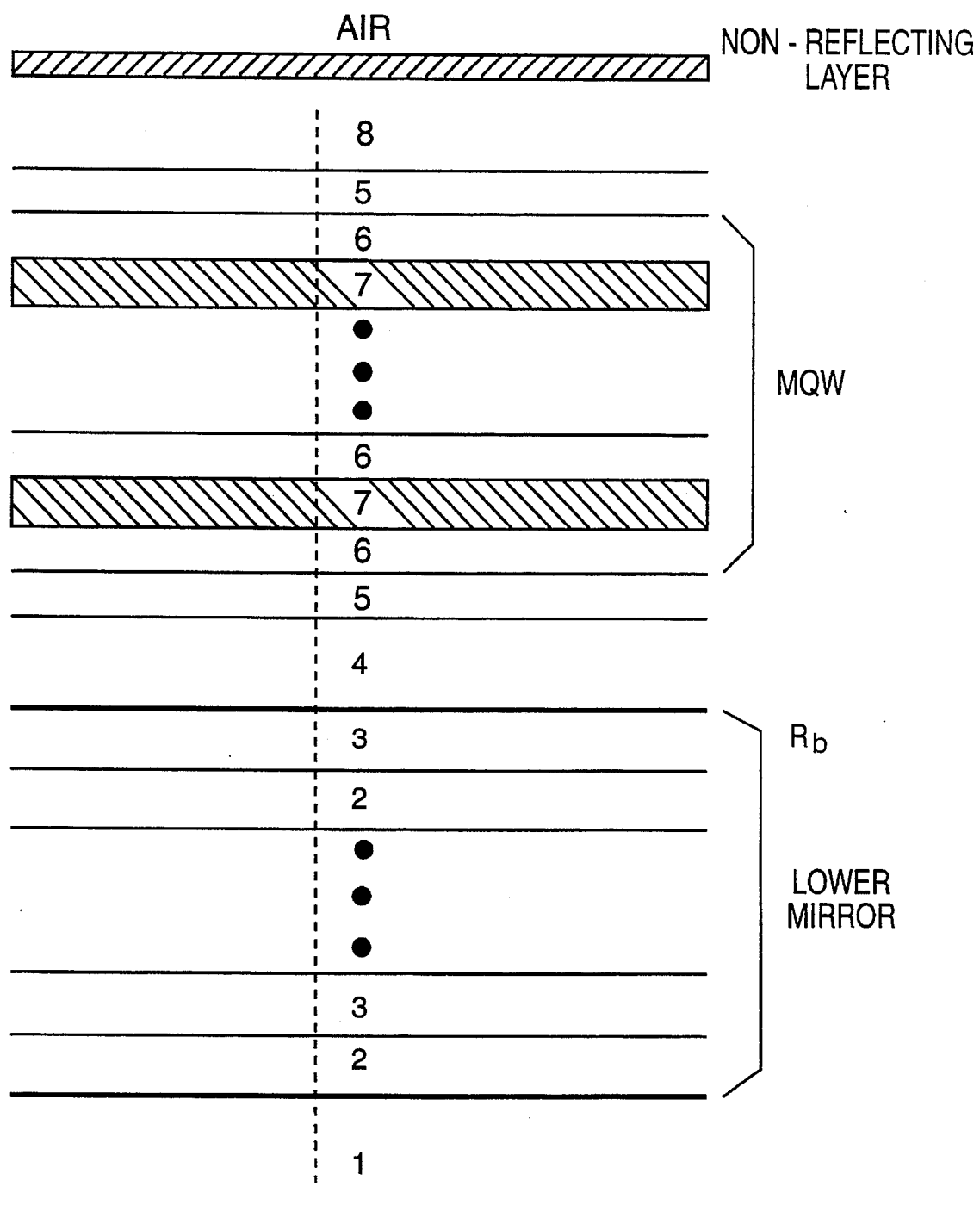
FIG. 11 is a cross-sectional view showing the construction of a conventional reflection type SEED.
Figure 12:
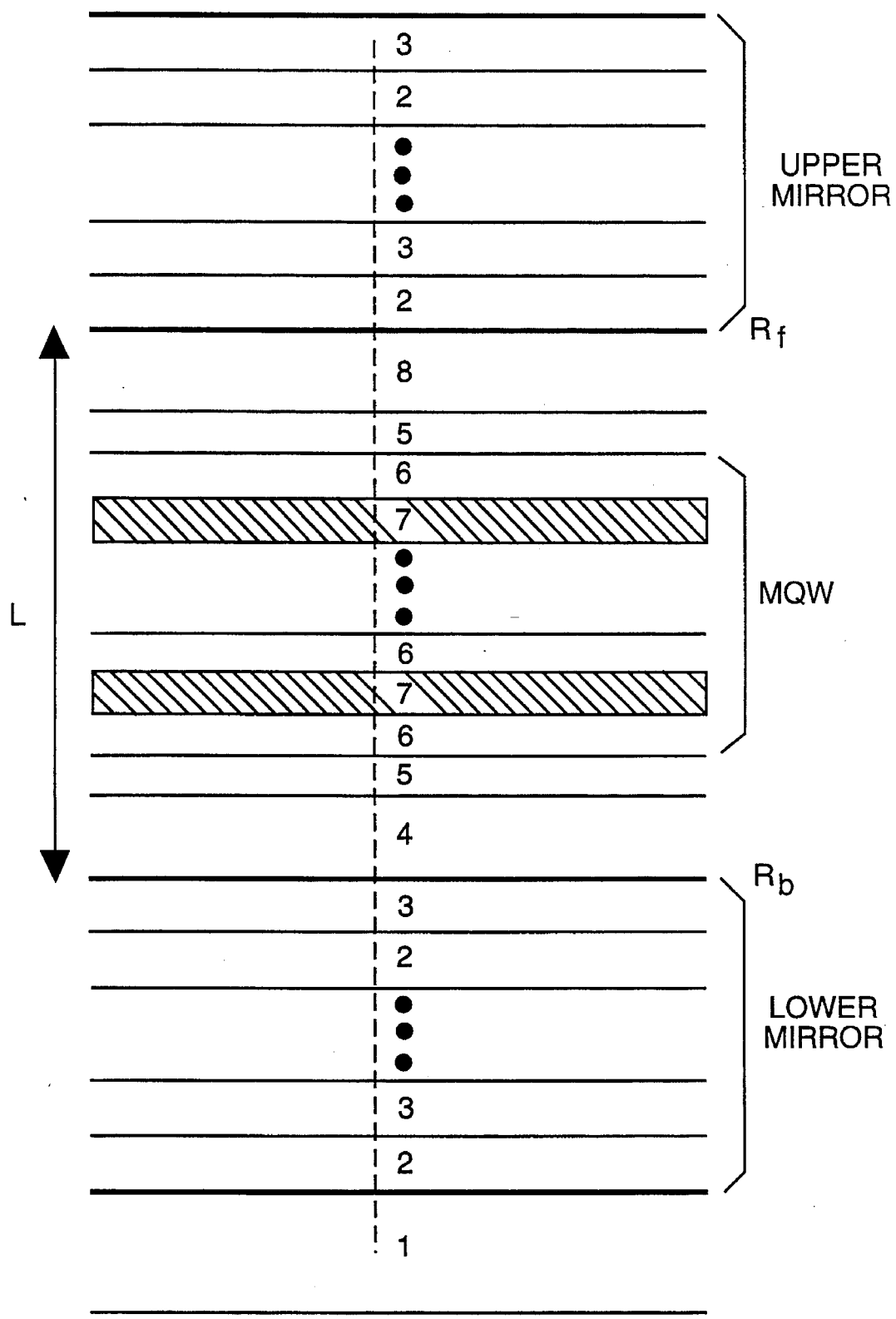
FIG. 12 is a cross-sectional view showing the construction of a conventional asymmetric Fabry-Perot SEED(AFP-SEED)
Figure 14:
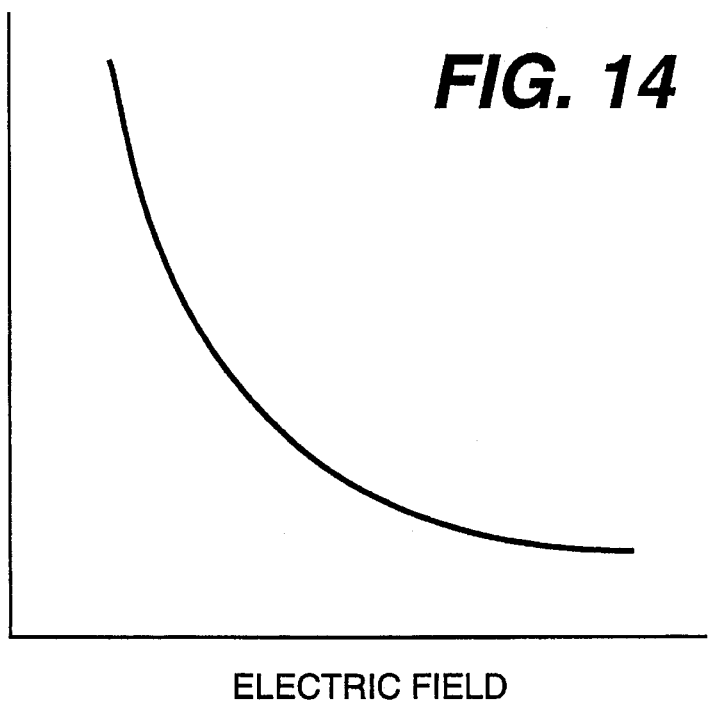
FIG. 14 is a curve diagram showing absorption coefficient to a vertical electric field at exciton resonance wavelength of the MQW.
Figure 15:
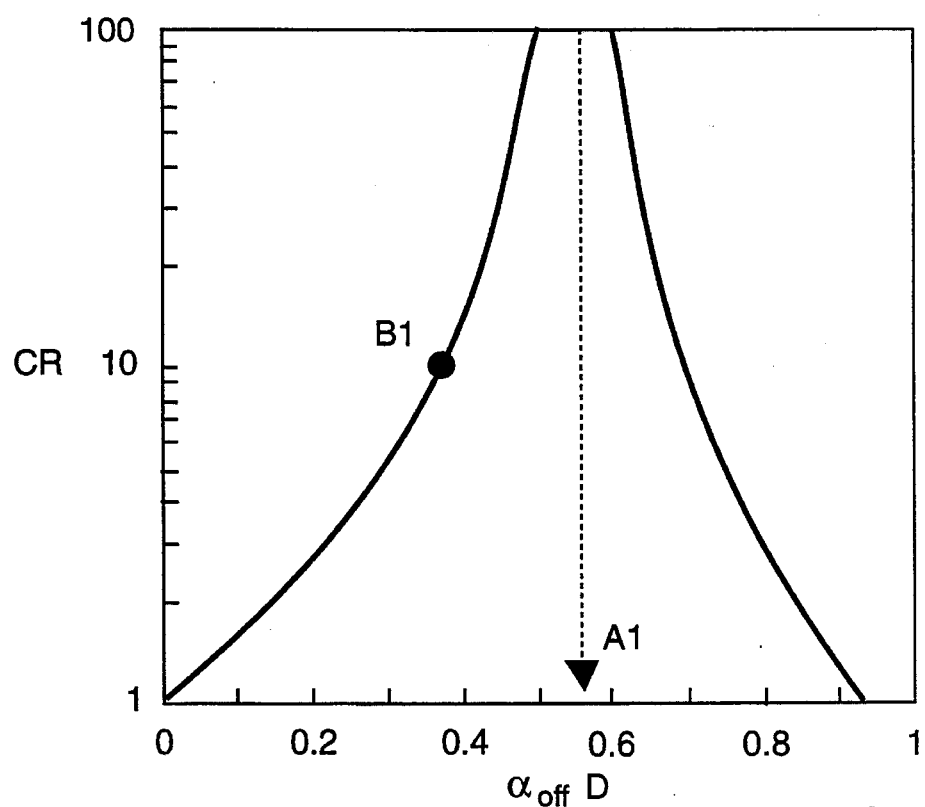
FIG. 15 is a curve diagram showing characteristics of impedance-matched AFP-SEED and impedance-mismatched AFP-SEED with respect to $\alpha \times D$, whereas $\alpha$ is absorption coefficient of ON/OFF contrast ratio CR and D is thickness of an optical absorbing layer thereof.
Figure 16:
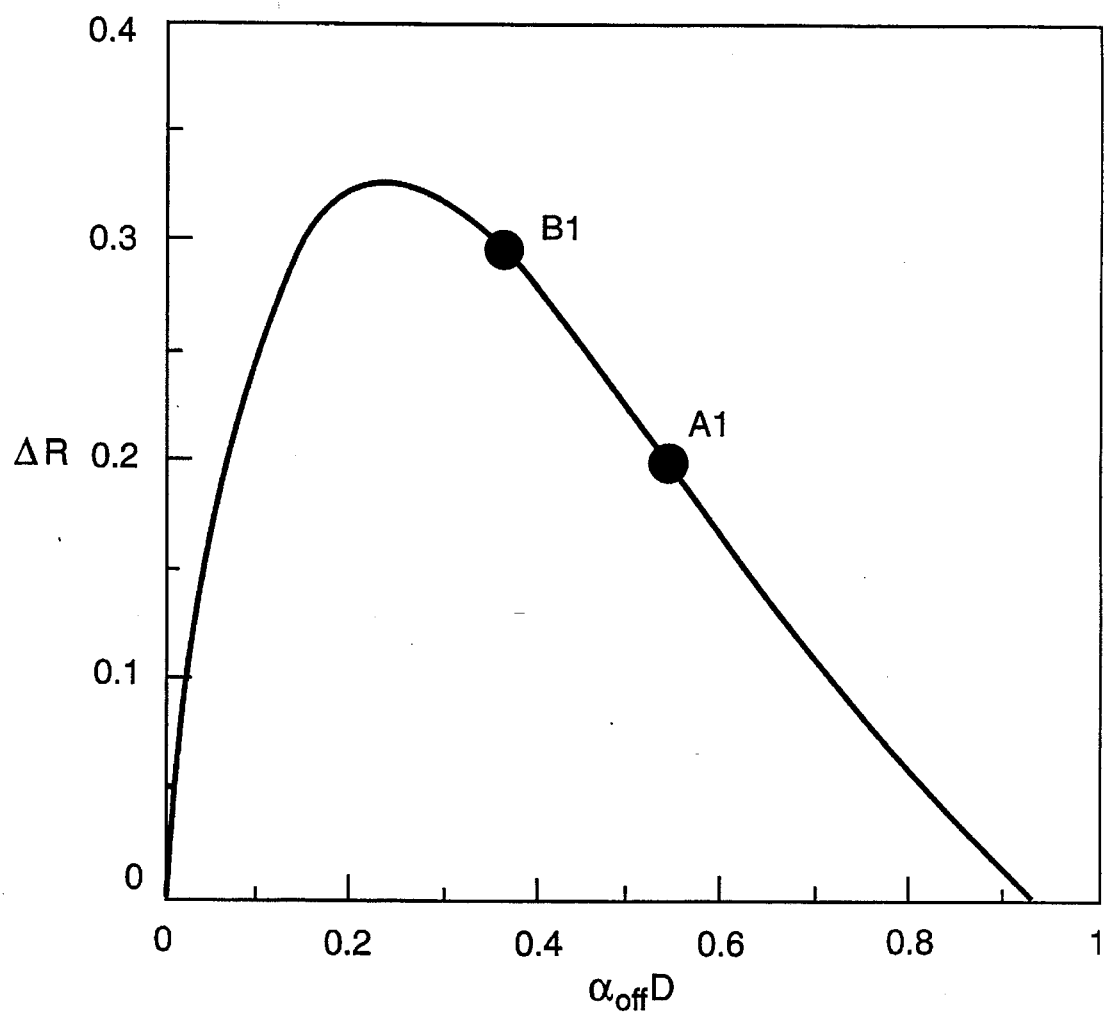
FIG. 16 is a curve diagram showing characteristics of $\alpha \times D$ in the AFP-SEED, whereas $\alpha$ is absorption coefficient of a difference of ON/OFF reflectance and D is thickness of an optical absorbing layer thereof.
Figure 20:
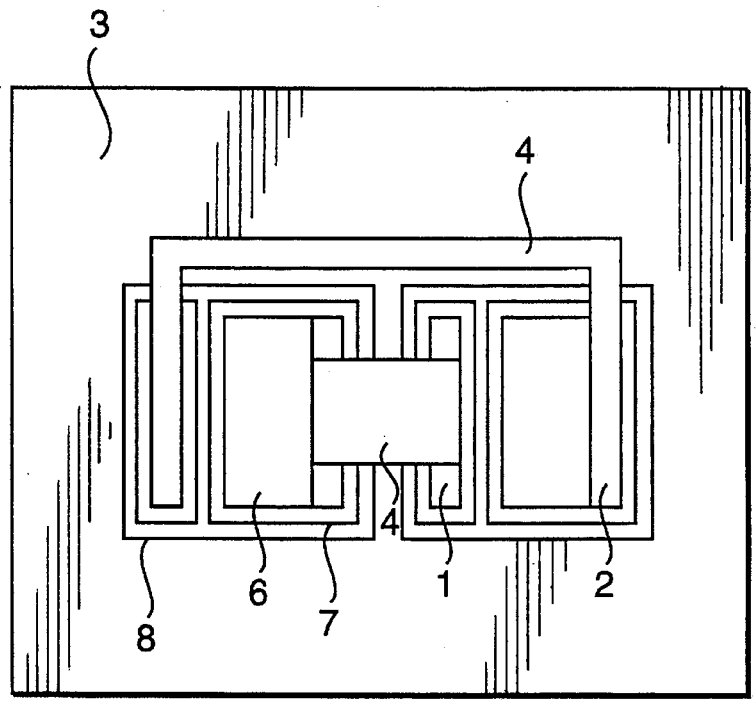
FIG. 20 is a plane view of the S-SEED according to one embodiment of the present invention.
Figure 21:
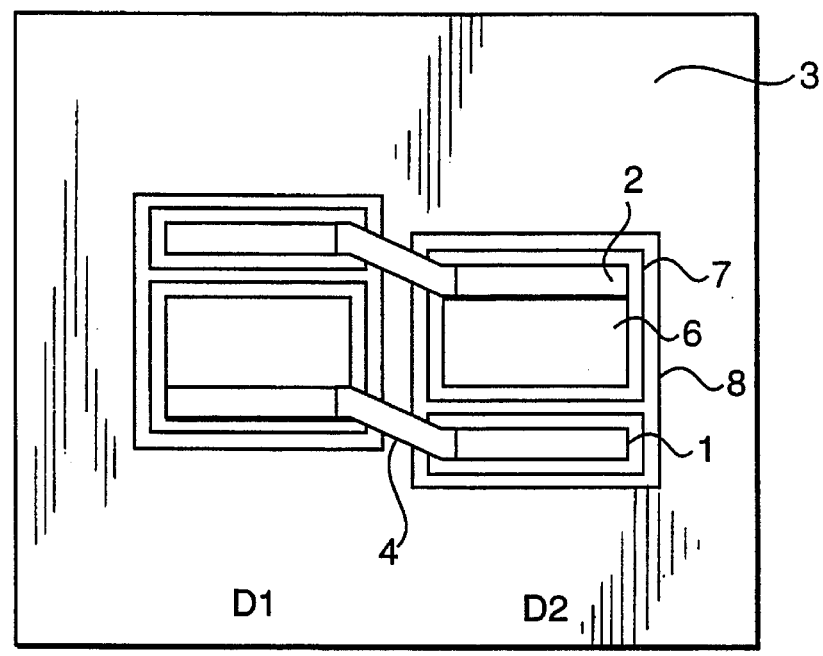
FIG. 21 is a plane view of the S-SEED according to another embodiment of the present invention.

FIGS. 20 and 21 are plane views showing layouts of the nonbiased optical devices of the present invention. FIG. 20 shows that the two PIN diode SEED's are connected in series to each other and each of the S-SEED's has the same structure as that of the conventional S-SEED. FIG. 21 shows that the two PIN diode SEED's D1 and D2 are connected in opposite direction to each other. In FIGS. 20 and 21, the same components as those in FIGS. 1 and 2 are indicated by the same reference numerals.

Figure 22:
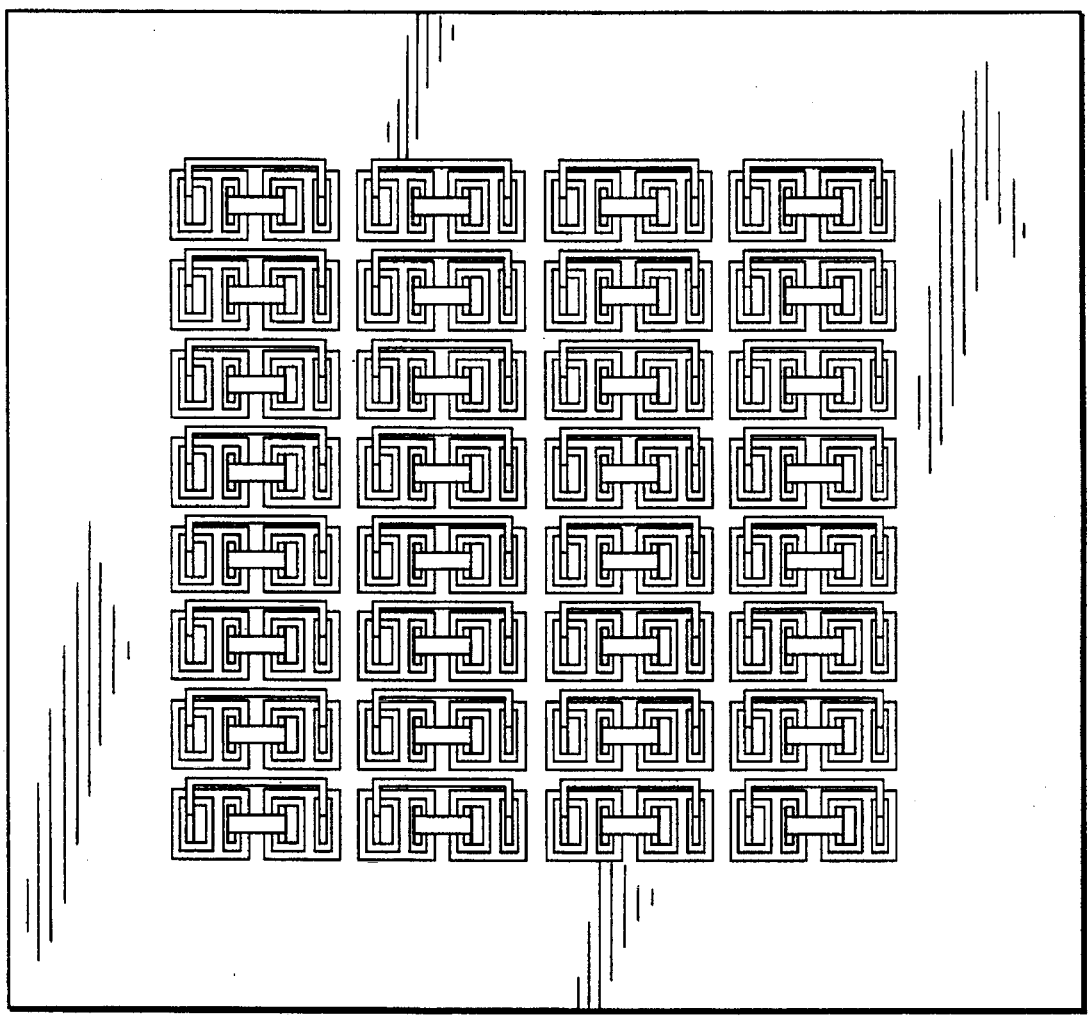
FIG. 22 is a plane view showing two-dimensional array of the S-SEED of FIG. 20.
Figure 23:
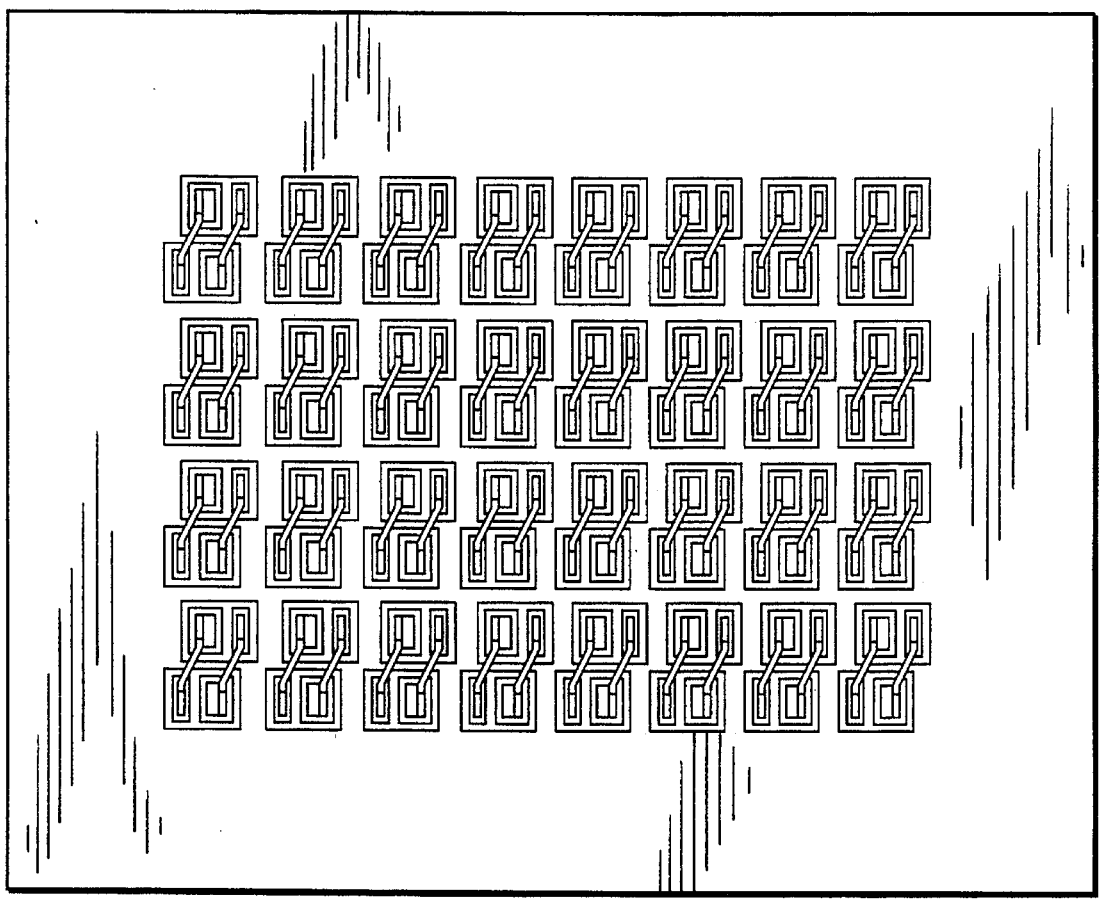
FIG. 23 is a plane view showing two-dimensional array of the S-SEED of FIG. 21.

Referring again to FIG. 21, because the first SEED D1 has a top n-layer and a bottom p-layer and the second SEED D2 has a top p-layer and a bottom n-layer, the p- and n-layers of the first SEED D1 are connected easily to the n- and p-layers of the second SEED D2 in structure. Optical windows 6 are horizontally placed so as to perform parallel optical signal processing easily. Thus, portions etched in depth direction of a lower mirror layer are not placed horizontally. As a result, length of a metallic line for connection of each diodes and an area occupied by the S-SEED can be minimized. FIG. 22 is a plane view showing two-dimensional array of the S-SEED of FIG. 20 and FIG. 23 is a plane view showing two-dimensional array of the S-SEED of FIG. 21.

Figure 24:
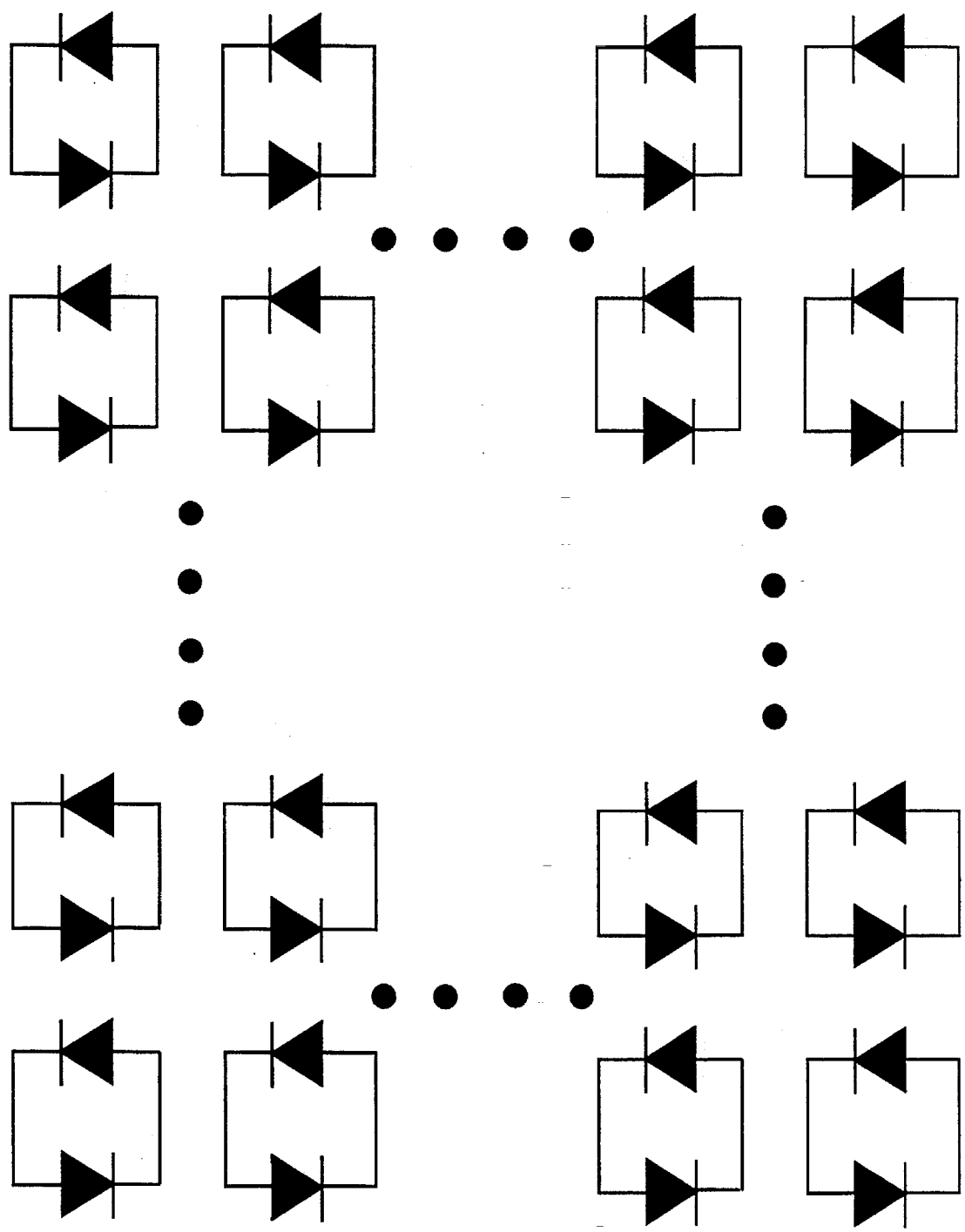
FIG. 24 is an equivalent circuit diagram of the S-SEED according to the present invention.

From the equivalent circuit of FIG. 24, it can be seen that respective nonbiased S-SEED's arranged in two-dimensional array are electrically isolated to each other. In the structure of the nonbiased S-SEED array, even if any one of the nonbiased S-SEED's is defective by electrical short, the other S-SEED's do not become damaged due to the defective S-SEED. Also, the nonbiased S-SEED array does not need a metallic line for supplying an externally applied voltage, and therefore can be improved in integration degree. In the nonbiased S-SEED array according to the present invention, parasitic elements such as resistance, inductance and capacitance, can be reduced on a semiconductor substrate. This is because a metallic line between respective S-SEED's can be shorten in length.

Figure 25:
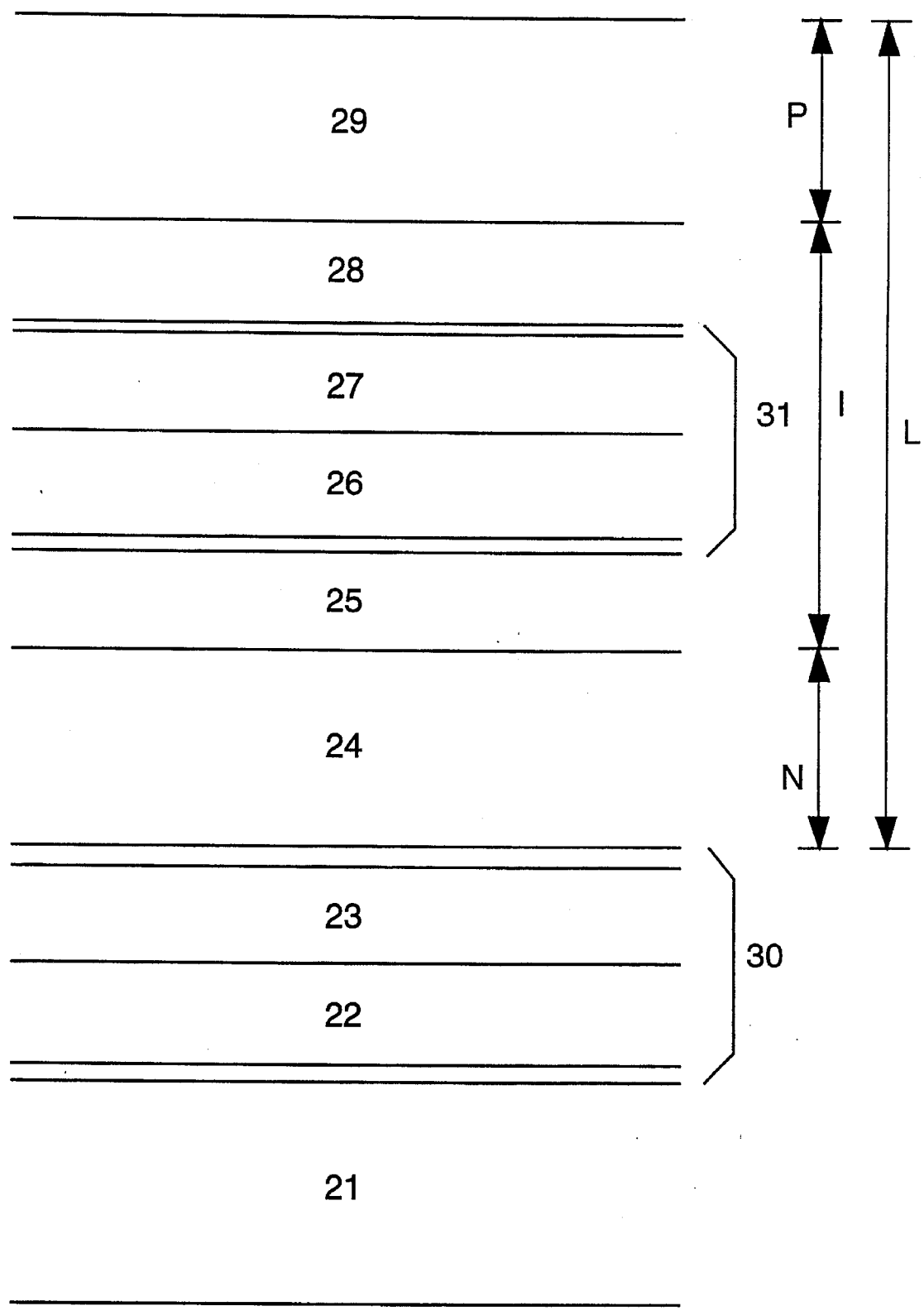
FIG. 25 is the structure of the SEED according to one embodiment of the present invention.

As shown in FIG. 25, the AFP-SEED structure having a shallow MQW in accordance with the present invention comprises a lower mirror 30, a cathode contact layer 24, a first buffer layer 25, an SMQW layer 31, a second buffer layer 28 and an anode contact layer 29, which are sequentially formed on a semi-insulating GaAs substrate 21. The lower mirror 30 has a plurality of reflecting layers which are repeatedly formed on the substrate 21 more than twelve times, preferably 14 times. Each of the reflecting layers is a quarter of the operation wavelength of 860 nm in optical length, and comprises a first $\lambda/4n$ reflecting film 22 which is formed of undoped AlAs having a relatively low refractive index (preferably, n=2.98) and a second $\lambda/4n$ reflecting film 23 which is formed of $Al_{0.1}Ga_{0.9}As$ having a relatively high refractive index (preferably, n=3.54), whereas n is refractive index and $\lambda$ is wavelength of an optical beam. In this embodiment, the first and second $\lambda/4n$ reflecting films 22 and 23 are 72.1 nm and 60.7 nm in thickness, respectively. Each of the reflecting layers has a reflectance of more than 95%.

Next, on the lower mirror 30 is formed the cathode contact layer 24 in which $N^+ Al_{0.1}Ga_{0.9}As$ is grown having thickness of 500 nm. The first buffer layer 25 of undoped $Al_{0.1}Ga_{0.9}As$ is formed having thickness of 20 nm on the cathode contact layer 24. On the first buffer layer 25 is also formed the SMQW layer 31. The SMQW layer 31 has a plurality of shallow films which are repeatedly formed at least more than thirty six times. Each of the shallow MQW films has an $Al_{0.04}Ga_{0.96}As$ barrier layer 26 of about 6 nm thickness and a GaAs well layer 27 of about 10 nm thickness.

Subsequently, on the SMQW layer 31 the second buffer layer 28 of undoped $Al_{0.1}Ga_{0.9}As$ is grown having thickness of about 20 nm. On the second buffer layer 28 is formed the anode contact layer 29 in which P$^+$ Al$_{0.1}$Ga$_{0.9}$As is grown having thickness of 506.7 nm.

In the PIN type SEED which is fabricated in accordance with the above processes, the layers 24 to 29 formed on the lower mirror 30 is preferably approximately 1622.7 nm in total thickness L. Then, asymmetric Fabry-Perot cavity is formed having length of λ/4n avg in the lower mirror 30, whereas n avg is twenty seven times as large as average refractive index of the cavity. Thus, a top mirror having reflectance of about 30% is spontaneously produced thereon in air. In the PIN diode structure serving the SMQW layer 31 as an intrinsic region, an asymmetric Fabry-Perot(ASFP) resonant structure is formed in which reflectance of the top mirror is different from that of the lower mirror.

The number of the repeatedly formed shallow films is determined to be set to integer value m meeting following equation (1), in case that total reflectance RT of ASFP cavity becomes zero, when an external voltage is applied, or under zero-bias:

$$RF = RB \exp(-2\alpha_0 mt) \tag{1}$$

whereas RF is reflectance of the top mirror, RB is reflectance of the lower mirror, $\alpha_0$ is absorption coefficient of the SMQW layer 31 under zero-bias, and t is thickness of the SMQW layer.

In the SEED structure of FIG. 25, if $\alpha_0$ is 16000 cm$^{-1}$, the value of m to meet the above condition of RT=0 becomes 36, because RF=0.3, RB=0.95, and t=10 nm. Therefore, the number of the repeatedly formed shallow films is determined to be 36. As a result, the total thickness of the intrinsic region having the SMQW layer 31 is reduced to be about 0.62 μm, and thereby the electric field caused due to the internal voltage in thermal equilibrium is set to be 2.4×10$^4$ V/cm. By the electric field caused thus, the absorption coefficient of the SMQW layer 31 is further reduced and thereby the reflectance Ron is higher. If the electric field induced to the first diode D1 is 0.6×10$^3$ V/cm and the total thickness d of the SMQW layer is 0.62 μm, the electric field induced to the second diode D2 becomes 4.2×10$^4$ V/cm. As a result, a bistablity of the S-SEED can be largely improved.

Figure 26:
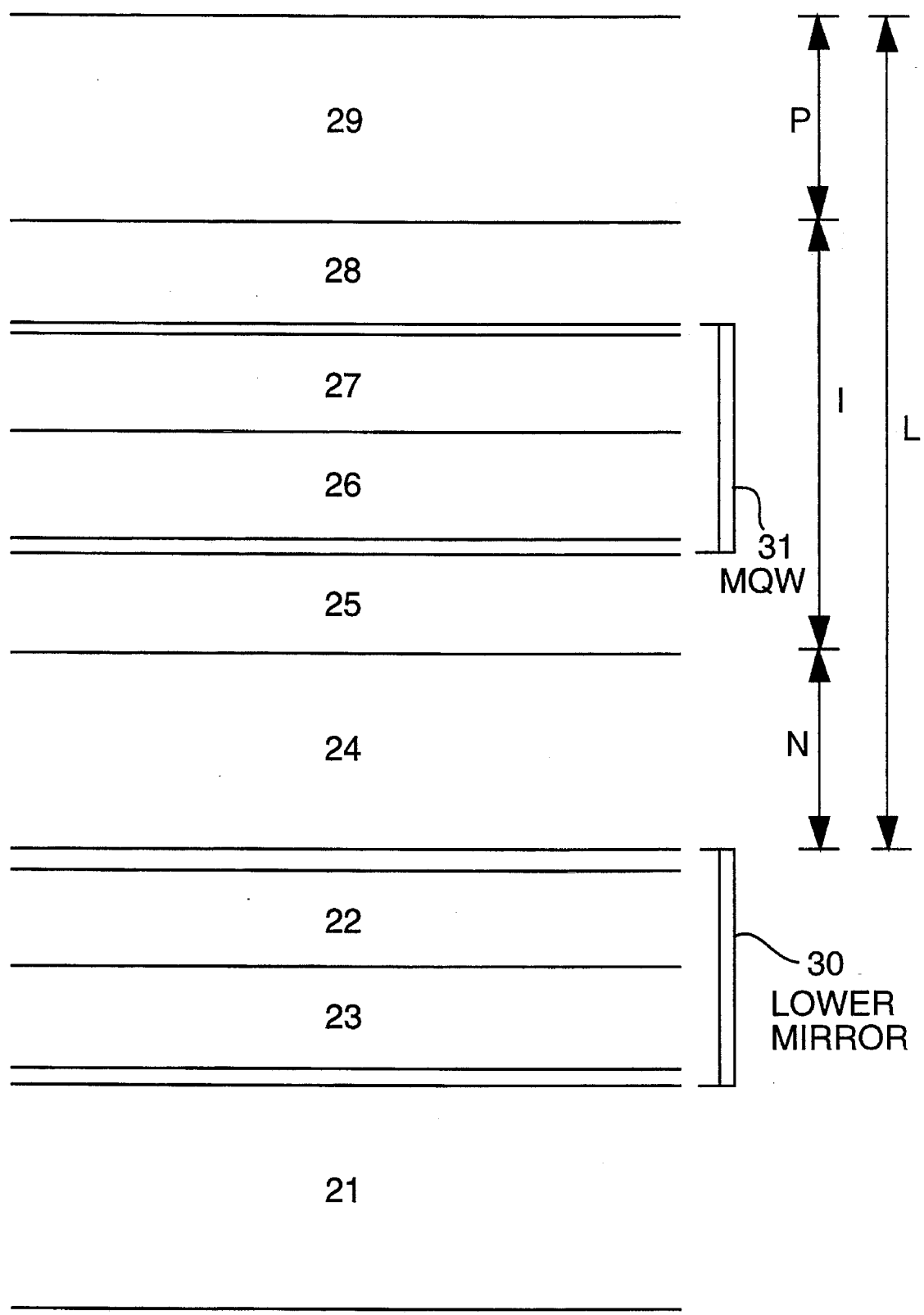
FIG. 26 is the structure of the SEED according to a further embodiment of the present invention.

FIG. 26 shows the SEED structure in accordance with a further embodiment of the present invention. In FIG. 26, the same components as those of FIG. 25 are indicated by the same reference numerals. The SEED of FIG. 26 has the same construction as that of FIG. 25 except that a lower mirror has a reflecting layer having a relatively high refractive index directly on a semi-insulating substrate. The method for fabricating the SEED will be described below.

As shown in FIG. 26, the SEED comprises a lower mirror 30, a cathode contact layer 24, a first buffer layer 25, an SMQW layer 31, a second buffer layer 28 and an anode contact layer 29, which are sequentially formed on a semi-insulating GaAs substrate 21. The lower mirror 30 has a plurality of reflecting layers which are repeatedly formed on the substrate 21 more than twelve times, preferably 14 times. Each of the reflecting layers is a quarter of the operation wavelength in optical length, and comprises a second λ/4n reflecting film 23 which is formed of undoped Al$_x$Ga$_{1-x}$As(0.1≦x≦0.3) having a relatively high refractive index (preferably, n=3.54) and a first λ/4n reflecting film 22 which is formed of undoped AlAs having a relatively low refractive index (preferably, n=2.98), whereas n is refractive index and λ is wavelength of an optical beam. In this embodiment, the second reflecting film 23 is formed directly on the substrate 21 and the first reflecting film 22 is formed on the second reflecting film 23.

Next, on the first reflecting film 22 of the lower mirror 30 is formed the cathode contact layer 24 in which N$^+$ Al$_x$Ga$_{1-x}$As(0.1≦x≦0.3) is grown. The first buffer layer 25 of undoped Al$_x$Ga$_{1-x}$As(0.1≦x≦0.3) is formed on the cathode contact layer 24. On the first buffer layer 25 is also formed the SMQW layer 31. The SMQW layer 31 has a plurality of shallow films which are repeatedly formed at least more than thirty six times. Each of the shallow MQW films has an undoped Al$_x$Ga$_{1-x}$As(0.1≦x≦0.3) barrier layer 26 and a GaAs well layer 27.

Subsequently, on the SMQW layer 31 the second buffer layer 28 of undoped Al$_x$Ga$_{1-x}$As(0.1≦x≦0.3) is grown having thickness of about 20 nm. On the second buffer layer 28 is formed the anode contact layer 29 in which P$^+$ Al$_x$Ga$_{1-x}$As(0.1≦x≦0.3) is grown.

Figure 27:
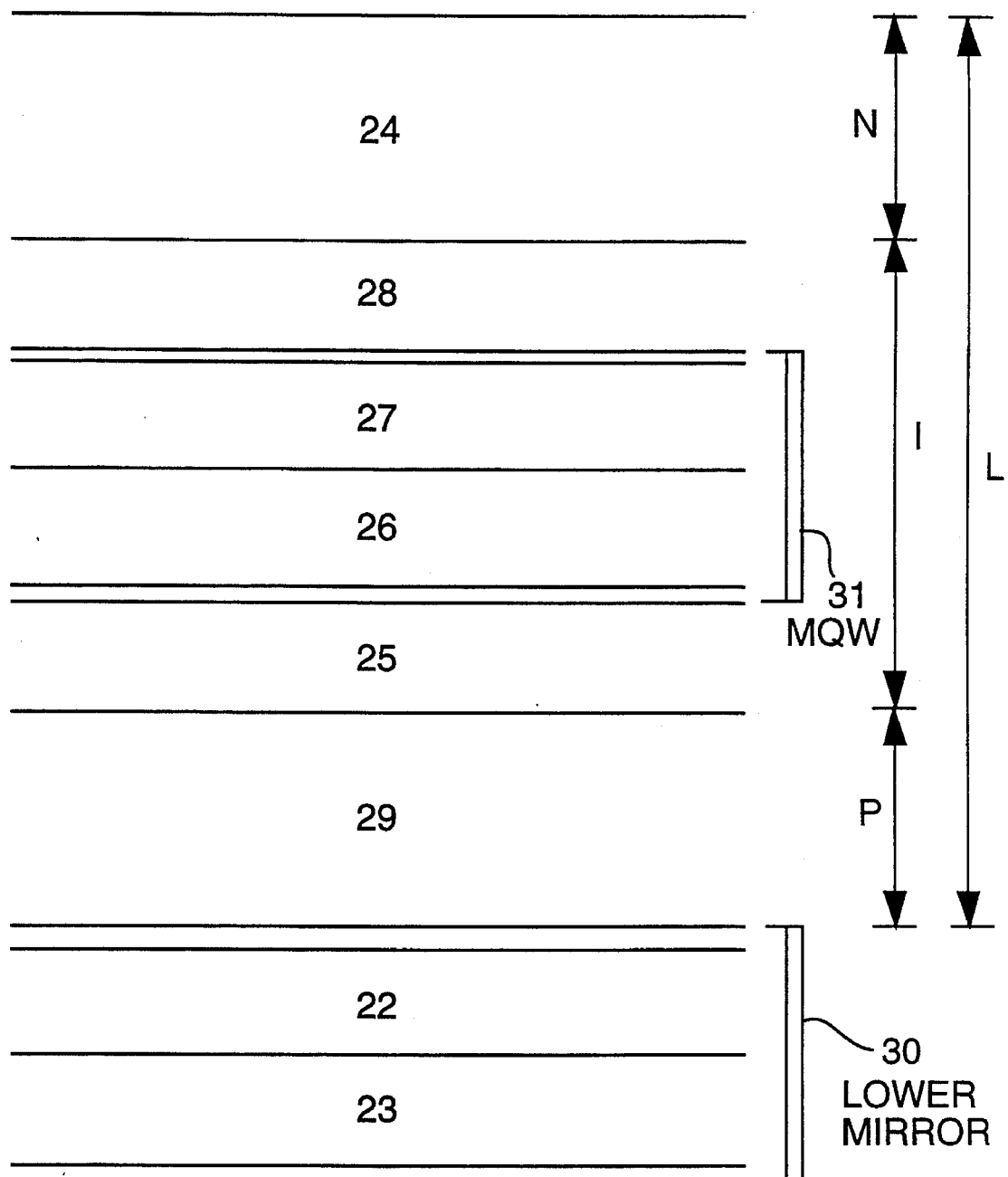
FIG. 27 is the structure of the SEED according to another embodiment of the present invention.

FIG. 27 shows the SEED structure in accordance with another embodiment of the present invention. In FIG. 27, the same components as those of FIG. 25 are indicated by the same reference numerals. The SEED of FIG. 27 has the same construction as that of FIG. 26 except that a cathode contact layer is exchanged with an anode contact layer. The method for fabricating the SEED will be described below.

As shown in FIG. 27, the SEED comprises a lower mirror 30, an anode contact layer 29, a first buffer layer 25, an SMQW layer 31, a second buffer layer 28 and a cathode contact layer 24, which are sequentially formed on a semi-insulating GaAs substrate 21. The lower mirror 30 has a plurality of reflecting layers which are repeatedly formed on the substrate 21 more than twelve times, preferably 14 times. Each of the reflecting layers is a quarter of the operation wavelength in optical length, and comprises a second λ/4n reflecting film 23 which is formed of undoped Al$_x$Ga$_{1-x}$As(0.1≦x≦0.3) having a relatively high refractive index (preferably, n=3.54) and a first λ/4n reflecting film 22 which is formed of undoped AlAs having a relatively low refractive index (preferably, n=2.98), whereas n is refractive index and λ is wavelength of an optical beam. In this embodiment, the second reflecting film 23 is formed directly on the substrate 21 and the first reflecting film 22 is formed on the second reflecting film 23.

Next, on the first reflecting film 22 of the lower mirror 30 is formed the anode contact layer 29 in which P$^+$ Al$_x$Ga$_{1-x}$As(0.1≦x≦0.3) is grown. The first buffer layer 25 of undoped Al$_x$Ga$_{1-x}$As(0.1≦x≦0.3) is formed on the anode contact layer 29. On the first buffer layer 25 is also formed the SMQW layer 31. The SMQW layer 31 has a plurality of shallow films which are repeatedly formed at least more than thirty six times. Each of the shallow MQW films has an undoped Al$_x$Ga$_{1-x}$As(0.1≦x≦0.3) barrier layer 26 and a GaAs well layer 27.

Subsequently, on the SMQW layer 31 the second buffer layer 28 of undoped Al$_x$Ga$_{1-x}$As(0.1≦x≦0.3) is grown having thickness of about 20 nm. On the second buffer layer 28 is formed the cathode contact layer 24 in which N$^+$ Al$_x$Ga$_{1-x}$As(0.1≦x≦0.3) is grown.

As described above, the nonbiased S-SEED fabricated according to the present invention has an excellent bistablity even without an external applied voltage. Even if a plurality of S-SEED's are arranged in two-dimensional array, the S-SEED's is electrically isolated with each other and each of the S-SEED's does not need a metallic line for supplying an external voltage. Therefore, the S-SEED array can be largely increased in integration degree.

Furthermore, because the S-SEED of the present invention does not need additional metallic interconnection lines for supplying a reverse voltage and connecting elements to each other and a metal pad for wire-bonding, inductive coupling capable of occurring between the lines can be reduced. Also, electromagnetic interference caused due to an electromagnetic field and crosstalk can be minimized.

Figure 28:
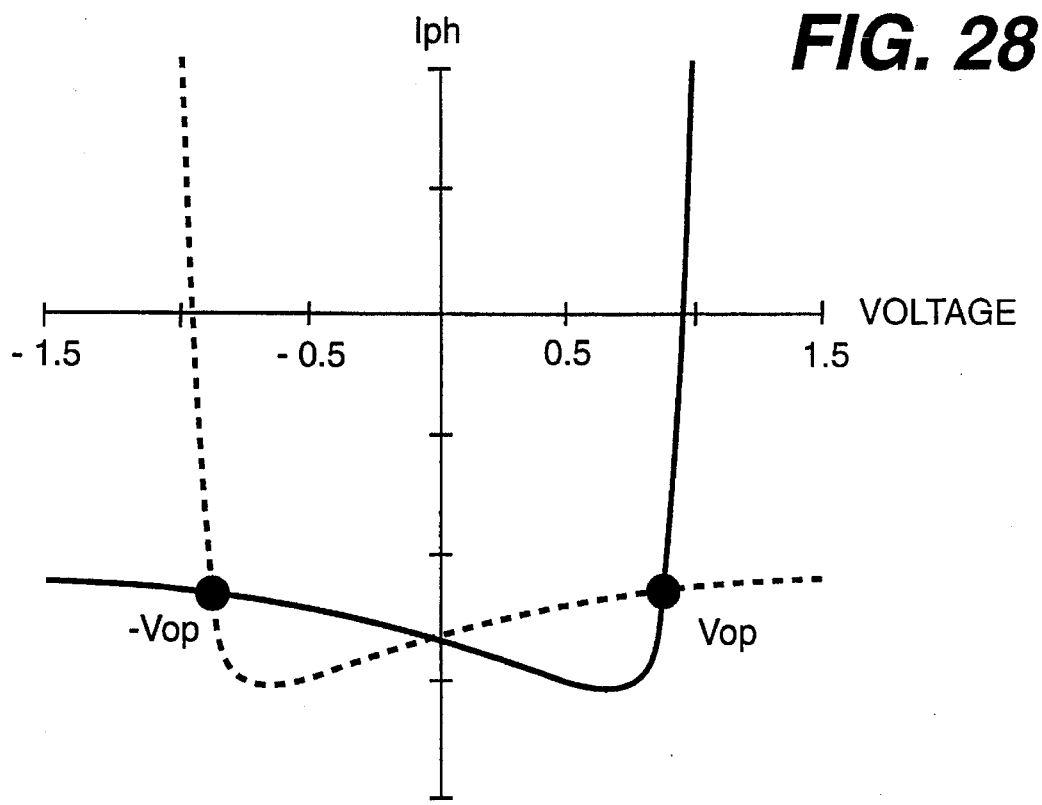
FIG. 28 is a load curve diagram of the S-SEED of the present invention.

In addition, voltages V1 and V2 of FIG. 19 correspond to stably operating voltages $V_{op}$ and $-V_{op}$ of FIG. 28, respectively. This means that, when the nonbiased S-SEED has optical bistablity, electric field induced to a first SEED is set to be $(V_{bi}-V_{op})/t_i$ and electric field induced to a second SEED is set to be $(V_{bi}+V_{op})/t_i$. Thus, so as to increase an electric field difference between the first and second SEED's, it is advantageous to reduce a value of $t_i$ as few as possible.

Figure 29:
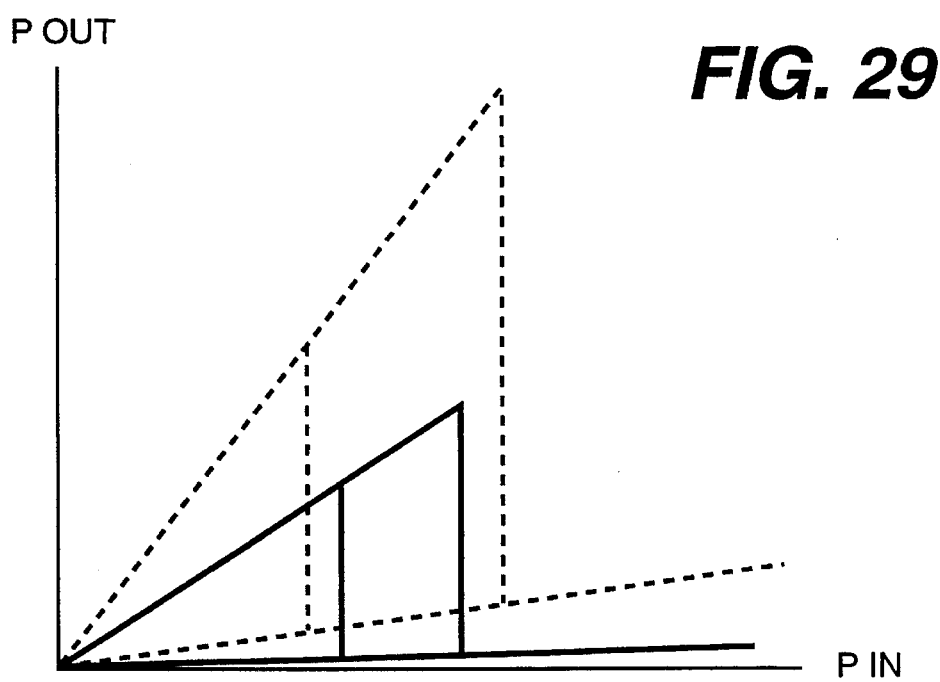
FIG. 29 is a curve diagram showing characteristics of the conventional impedance-mimatched S-SEED and the impedance-mismatched S-SEED of the present invention.

Also, as shown in FIG. 29, because the impedance-matched AFP(asymmetric Fabry-Perot)–NOBS(nonbiased S-SEED) is nearly zero in OFF state as compared to the impedance-mismatched AFP–NOBS, CR (ON/OFF contrast ratio) is extremely high, but $\Delta R$ (a difference between the reflectance of ON state and the reflectance of OFF state) and width of bistablity characteristic are relatively low. Therefore, because the nonbiased S-SEED in accordance with the present invention can be appropriately maintained in ON/OFF contrast ratio, it can be particularly applicable to an optical system.

It is understood that various other modifications will be apparent to and can be readily made by those skilled in the art without departing from the scope and spirit of this invention. Accordingly, it is not intended that the scope of the claims appended hereto be limited to the description as set forth herein, but rather that the claims be construed as encompassing all the features of patentable novelty that reside in the present invention, including all features that would be treated as equivalents thereof by those skilled in the art which this invention pertains.

What is claimed is:

1. A nonbiased bistable optical device comprising:

a semi-insulating GaAs substrate;

a lower mirror having a plurality of reflecting layers which are repeatedly formed on said substrate at least more than twelve times, each of said reflecting layers having a first reflecting film having a first refractive index on said substrate and a second reflecting film having a second refractive index different from the first refractive index;

a first contact layer formed on the lower mirror;

a first buffer layer formed on the first contact layer;

a multiple quantum well(MQW) having a plurality of shallow layers which are repeatedly formed, each of said shallow layers having a barrier and a shallow quantum well;

a second buffer layer grown on said MQW; and a second contact layer formed on said second buffer layer.

2. The nonbiased bistable optical device as defined in claim 1, wherein said shallow layers are repeatedly formed at least thirty six times.

3. The nonbiased bistable optical device as defined in claim 2, wherein the first refractive index is relatively lower than the second refractive index.

4. The nonbiased bistable optical device as defined in claim 1, wherein said first reflecting film is formed of undoped AlAs and said second reflecting film is formed of undoped $Al_xGa_{1-x}As(0.1 \leq x \leq 0.3)$.

5. The nonbiased bistable optical device as defined in claim 1, wherein said first contact layer is a $P^+$ anode contact layer and said second contact layer is an $N^+$ cathode contact layer.

6. The nonbiased bistable optical device as defined in claim 1, wherein said first contact layer is an $N^+$ cathode contact layer and said second contact layer is a $P^+$ anode contact layer.

* * * * *